United States Patent
Allbright et al.

(10) Patent No.: US 11,521,211 B2
(45) Date of Patent: Dec. 6, 2022

(54) SYSTEMS AND METHODS FOR INCORPORATING BREACH VELOCITIES INTO FRAUD SCORING MODELS

(71) Applicant: MASTERCARD INTERNATIONAL INCORPORATED, Purchase, NY (US)

(72) Inventors: Joshua A. Allbright, Valley Park, MO (US); Amudhan Venkatesan, Vancouver (CA); Felix Johannes Flory, Wildwood, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 40 days.

(21) Appl. No.: 16/235,529

(22) Filed: Dec. 28, 2018

(65) Prior Publication Data

US 2020/0211022 A1 Jul. 2, 2020

(51) Int. Cl.
*G06Q 20/40* (2012.01)
*H04L 9/40* (2022.01)

(52) U.S. Cl.
CPC ..... *G06Q 20/4016* (2013.01); *G06Q 20/4093* (2013.01); *H04L 63/10* (2013.01)

(58) Field of Classification Search
CPC .......... G06Q 20/4016; G06Q 30/0185; G06Q 20/382; G06Q 20/401; G06Q 20/34; G06Q 20/4093; H04L 63/10; H04L 63/1408
See application file for complete search history.

(56) References Cited

U.S. PATENT DOCUMENTS 6,254,000 B1  7/2001  Degen et al.
6,658,393 B1  12/2003  Basch et al.
(Continued)

FOREIGN PATENT DOCUMENTS

EP    2420966 A1    2/2012
WO    2001077959 A1    10/2001
(Continued)

OTHER PUBLICATIONS

PCT International Search Report and Written Opinion, Application No. PCTIUS2018/031980, dated Jul. 26, 2018, pgs.
(Continued)

*Primary Examiner* — Elda G Milef
(74) *Attorney, Agent, or Firm* — Armstrong Teasdale LLP

(57) ABSTRACT

A method and system for detecting fraudulent network events in a payment card network by incorporating breach velocities into fraud scoring models are provided. A potential compromise event is detected, and payment cards that transacted at a compromised entity associated with the potential compromise event are identified. Subsequent transaction activity for the payment cards is reviewed, and a data structure for the payment cards are generated. The data structure sorts subsequent transaction activity into fraud score range stripes. The data structure is parsed over a plurality of time periods, and at least one cumulative metric is calculated for each of the time periods in each fraud score range stripe. A plurality of ratio striping values are determined, and a set of feature inputs is generated using the ratio striping values. The feature inputs are applied to a scoring model used to score future real-time transactions initiated using the payment cards.

20 Claims, 8 Drawing Sheets

(56) References Cited

U.S. PATENT DOCUMENTS

| | | | |
|---|---|---|---|
| 7,580,891 B2 | 8/2009 | Klebanoff | |
| 7,814,008 B2 | 10/2010 | Choudhuri et al. | |
| 8,266,059 B2 | 9/2012 | Horvath et al. | |
| 8,423,467 B1 | 4/2013 | Johansson et al. | |
| 8,489,476 B1 | 7/2013 | Lester | |
| 8,600,872 B1 | 12/2013 | Yan | |
| 8,606,700 B2 | 12/2013 | Carlson et al. | |
| 8,612,340 B1 | 12/2013 | Yan | |
| 8,620,801 B2 | 12/2013 | Choudhuri et al. | |
| 8,694,429 B1 | 4/2014 | Ballaro et al. | |
| 8,706,641 B2 | 4/2014 | Bruesewitz et al. | |
| 8,744,941 B2 | 6/2014 | Chisholm | |
| 8,744,958 B2 | 6/2014 | Carlson et al. | |
| 9,230,280 B1 | 1/2016 | Maag et al. | |
| 9,256,780 B1 | 2/2016 | DeBattista | |
| 9,256,810 B2 | 2/2016 | Wu et al. | |
| 9,256,870 B1 | 2/2016 | Howe | |
| 9,331,994 B2 | 5/2016 | Grigg et al. | |
| 9,392,008 B1 | 7/2016 | Michel et al. | |
| 9,412,108 B2 | 8/2016 | Wang et al. | |
| 9,477,960 B2 | 10/2016 | Grigg et al. | |
| 9,483,766 B2 | 11/2016 | Grigg et al. | |
| 9,547,864 B2 | 1/2017 | Howe et al. | |
| 9,601,000 B1 | 3/2017 | Gruss et al. | |
| 9,661,012 B2 | 5/2017 | Michel et al. | |
| 9,721,080 B2 | 8/2017 | Moran et al. | |
| 9,898,741 B2 * | 2/2018 | Siegel | G06Q 20/4016 |
| 10,339,606 B2 * | 7/2019 | Gupta | G06Q 40/12 |
| 10,308,033 B2 | 8/2019 | Moran et al. | |
| 10,380,333 B1 | 8/2019 | Moran et al. | |
| 10,395,243 B1 | 8/2019 | Johannson et al. | |
| 10,586,235 B2 | 3/2020 | Wang et al. | |
| 10,937,030 B2 | 3/2021 | Allbright et al. | |
| 11,151,569 B2 | 10/2021 | Allbright et al. | |
| 11,157,913 B2 | 10/2021 | Allbright et al. | |
| 2003/0217094 A1 | 11/2003 | Andrews et al. | |
| 2004/0034604 A1 | 2/2004 | Klebanoff | |
| 2004/0162773 A1 | 8/2004 | Del Rey | |
| 2005/0055373 A1 | 3/2005 | Forman | |
| 2007/0094067 A1 | 4/2007 | Kumar et al. | |
| 2007/0185782 A1 | 8/2007 | Shooks | |
| 2007/0203732 A1 | 8/2007 | Griegel et al. | |
| 2009/0132347 A1 | 5/2009 | Anderson | |
| 2009/0132404 A1 | 5/2009 | King et al. | |
| 2009/0276269 A1 | 11/2009 | Yee et al. | |
| 2009/0307049 A1 | 12/2009 | Elliott, Jr. et al. | |
| 2010/0228580 A1 | 9/2010 | Zoldi et al. | |
| 2010/0280882 A1 | 11/2010 | Faith et al. | |
| 2011/0055074 A1 | 3/2011 | Chen et al. | |
| 2011/0078034 A1 | 3/2011 | Hayhow | |
| 2012/0084207 A1 | 4/2012 | Horvath et al. | |
| 2012/0239557 A1 | 9/2012 | Weinflash et al. | |
| 2012/0296824 A1 | 11/2012 | Rosano | |
| 2013/0036036 A1 | 2/2013 | Zoldi et al. | |
| 2013/0159077 A1 | 6/2013 | Stringfellow et al. | |
| 2013/0231976 A1 | 9/2013 | Tavares et al. | |
| 2013/0297473 A1 | 11/2013 | Wolfe | |
| 2014/0032409 A1 | 1/2014 | Rosano | |
| 2014/0249934 A1 | 9/2014 | Subramanian et al. | |
| 2014/0258099 A1 | 9/2014 | Rosano | |
| 2014/0279185 A1 | 9/2014 | Merz et al. | |
| 2014/0279331 A1 | 9/2014 | Gimby et al. | |
| 2014/0324522 A1 | 10/2014 | Wilkins et al. | |
| 2014/0337215 A1 | 11/2014 | Howe | |
| 2015/0012430 A1 | 1/2015 | Chisholm et al. | |
| 2015/0046338 A1 | 2/2015 | Laxminarayanan et al. | |
| 2015/0073981 A1 * | 3/2015 | Adjaoute | G06Q 20/4016 705/39 |
| 2015/0127547 A1 | 5/2015 | Powell et al. | |
| 2015/0220999 A1 | 8/2015 | Thornton et al. | |
| 2015/0339667 A1 | 11/2015 | Dua | |
| 2015/0339673 A1 | 11/2015 | Adjaoute | |
| 2015/0348023 A1 | 12/2015 | Fisher et al. | |
| 2015/0371207 A1 | 12/2015 | Cummins et al. | |
| 2016/0125317 A1 | 5/2016 | Benjamin | |
| 2016/0125405 A1 | 5/2016 | Alterman | |
| 2016/0155124 A1 | 6/2016 | Howe et al. | |
| 2016/0162759 A1 | 6/2016 | Yun et al. | |
| 2016/0171498 A1 | 6/2016 | Wang et al. | |
| 2016/0180333 A1 | 6/2016 | Leyva | |
| 2016/0196615 A1 | 7/2016 | Yen et al. | |
| 2016/0217470 A1 | 7/2016 | Gerard et al. | |
| 2016/0335641 A1 | 11/2016 | White et al. | |
| 2016/0352766 A1 | 12/2016 | Flacher et al. | |
| 2016/0364727 A1 * | 12/2016 | DeLawter | G06Q 20/4014 |
| 2016/0364728 A1 | 12/2016 | DeLawter et al. | |
| 2017/0053294 A1 | 2/2017 | Yang et al. | |
| 2017/0116585 A1 | 4/2017 | Rosano | |
| 2017/0140262 A1 | 5/2017 | Wilson et al. | |
| 2017/0169500 A1 | 6/2017 | Merz et al. | |
| 2017/0193515 A1 | 7/2017 | Sharan et al. | |
| 2017/0293906 A1 | 10/2017 | Komarov | |
| 2017/0352026 A1 | 12/2017 | Musil et al. | |
| 2018/0018670 A1 | 1/2018 | Ju et al. | |
| 2018/0047024 A1 | 2/2018 | Niehaus | |
| 2018/0053188 A1 | 2/2018 | Zoldi et al. | |
| 2018/0114203 A1 | 4/2018 | Send et al. | |
| 2018/0182029 A1 * | 6/2018 | Vinay | G06N 20/00 |
| 2018/0218369 A1 | 8/2018 | Xiao et al. | |
| 2019/0066109 A1 | 2/2019 | Jia et al. | |
| 2019/0073647 A1 | 3/2019 | Zoldi et al. | |
| 2019/0130403 A1 | 5/2019 | Merz et al. | |
| 2019/0220864 A1 | 7/2019 | Avegliano et al. | |
| 2019/0220865 A1 | 7/2019 | Weber | |
| 2019/0279309 A1 | 9/2019 | Gupta et al. | |

FOREIGN PATENT DOCUMENTS

| | | |
|---|---|---|
| WO | 2011077959 A1 | 10/2001 |
| WO | 2002025495 A1 | 3/2002 |
| WO | 2004070293 A1 | 8/2004 |
| WO | 2009067346 A2 | 5/2009 |
| WO | 2011025689 A1 | 3/2011 |
| WO | 2012135115 A2 | 10/2012 |
| WO | 2017031039 A1 | 2/2017 |

OTHER PUBLICATIONS

Baboo et al. "Analysis of Spending Pattern on Credit Card Detection," IOSR Journal of Computer Engineering, Mar.-Apr. 2017 (Year: 2017).

PCT International Search Report and Written Opinion, Application No. PCT/US2018/052143, dated Dec. 7, 2018, 12 pps.

PCT International Search Report and Written Opinion, Application No. PCT/US2018/059326, dated Mar. 7, 2019, 11 pps.

Wikipedia, "Collaborative Filtering," https://web.archive.org (Year: 2017).

PCT International Search Report and Written Opinion, Application No. PCT/US2018/052145, dated Feb. 12, 2019, 12 pps.

"Technology Briefs", Publication Info: Card News; Potomac vol. 14, Iss. 4, March (Year 1999).

T. K. Behera and S. Panigrahi, "Credit Card Fraud Detection: A Hybrid Approach Using Fuzzy Clustering & Neural Network," 2015 Second International Conference on Advances in Computing and Communication Engineering, Dehradun, 2015, pp. 494-499, doi: 10.1109/ICACCE.2015.33. (Year: 2015).

* cited by examiner

SYSTEMS AND METHODS FOR INCORPORATING BREACH VELOCITIES INTO FRAUD SCORING MODELS

BACKGROUND

This disclosure relates generally to fraud detection in a network and, more particularly, to computer systems and computer-based methods for incorporating breach velocities into fraud scoring models.

Payment processing networks process numerous payment card transactions every day through numerous merchants. Most of these payment card transactions are valid transactions. However, at least some of these payment card transactions are fraudulent. Payment card transaction processors, such as payment networks and issuing banks, may monitor payment card transactions for signs of fraudulent activity. At least some known fraud detection systems monitor payment card transactions one payment card transaction at a time to determine whether the payment card transaction is potentially fraudulent. Computer models used to monitor and detect fraud are static models, in that, once set, the models analyze the payment card transactions in the same way over time. The static models may not be able to detect low-level fraud attacks or changing tactics of the fraudulent activity.

BRIEF DESCRIPTION

In one embodiment, a computing system for detecting and preventing fraudulent network events in a payment card network by incorporating breach velocities into fraud scoring models is provided. The computing system includes a compromise detection and prevention (CDP) engine configured to detect a potential compromise event, the potential compromise event associated with a compromised entity, and identify a plurality of payment cards that initiated one or more payment card transactions at the compromised entity within a first selected time period associated with the potential compromise event. The CDP engine is also configured to review all subsequent transaction activity for each of the plurality of payment cards for a second selected time period after the potential compromise event. The respective subsequent transaction activity for each payment card includes one or more subsequent payment card transactions, each subsequent payment card transaction associated with a respective fraud score calculated using a first fraud scoring model. The CDP engine is further configured to generate a data structure that classifies each subsequent payment card transaction over a plurality of fraud score range stripes based on the respective fraud score, and parse the data structure over a plurality of time periods. Each of the time periods extends back over a respective predetermined interval from a common starting point. The CDP engine is also configured to calculate, for each of the time periods, at least one cumulative metric from the subsequent payment card transactions associated with each of the fraud score range stripes, and determine a plurality of ratio striping values. Each of the ratio striping values is a ratio of a first value of the at least one cumulative metric in a first of the fraud score range stripes from a first time period with respect to a second value of the at least one cumulative metric in the first fraud score range stripe from a second time period. The second time period extends back farther in time than the first time period. The CDP engine is still further configured to generate a set of feature inputs using the determined plurality of ratio striping values. The computing system also includes a fraud detection module communicatively coupled to the CDP engine at which the first fraud scoring model is executed. The fraud detection module is configured to apply the set of feature inputs to update the first fraud scoring model, and score one or more real-time payment card transactions initiated using any payment card of the plurality of payment cards using the updated first fraud scoring model.

In another embodiment, a computer-implemented method for detecting fraudulent network transactions in a payment card transaction network by incorporating breach velocities into fraud scoring models is provided. The method is implemented using at least one computing device having at least one processor. The method includes detecting a potential compromise event, the potential compromise event associated with a compromised entity, and identifying a plurality of payment cards that initiated one or more payment card transactions at the compromised entity within a first selected time period associated with the potential compromise event. The method also includes reviewing all subsequent transaction activity for each of the plurality of payment cards for a second selected time period after the potential compromise event, the respective subsequent transaction activity for each payment card including one or more subsequent payment card transactions. Each subsequent payment card transaction is associated with a respective fraud score calculated using a first fraud scoring model. The method further includes generating a data structure that classifies each subsequent payment card transaction over a plurality of fraud score range stripes based on the respective fraud score, parsing the data structure over a plurality of time periods, wherein each of the time periods extends back over a respective predetermined interval from a common starting point, and calculating for each of the time periods, at least one cumulative metric from the subsequent payment card transactions associated with each of the fraud score range stripes. The method also includes determining a plurality of ratio striping values, each of the ratio striping values being a ratio of a first value of the at least one cumulative metric in a first of the fraud score range stripes from a first time period with respect to a second value of the at least one cumulative metric in the first fraud score range stripe from a second time period, wherein the second time period extends back farther in time than the first time period, and generating a set of feature inputs using the determined plurality of ratio striping values. The method still further includes applying the set of feature inputs to update the first fraud scoring model, and scoring one or more real-time payment card transactions initiated using any payment card of the plurality of payment cards using the updated first fraud scoring model.

In yet another embodiment, at least one non-transitory computer-readable storage media has computer-executable instructions embodied thereon. When executed by at least one processor, the computer-executable instructions cause the at least one processor to detect a potential compromise event, the potential compromise event associated with a compromised entity, identify a plurality of payment cards that initiated one or more payment card transactions at the compromised entity within a first selected time period associated with the potential compromise event, and review all subsequent transaction activity for each of the plurality of payment cards for a second selected time period after the potential compromise event. The respective subsequent transaction activity for each payment card includes one or more subsequent payment card transactions, each subsequent payment card transaction associated with a respective fraud score calculated using a first fraud scoring model. The computer-executable instructions cause the at least one processor to generate a data structure that classifies each subsequent payment card transaction over a plurality of fraud score range stripes based on the respective fraud score, parse the data structure over a plurality of time periods, wherein each of the time periods extends back over a respective predetermined interval from a common starting point, and calculate, for each of the time periods, at least one cumulative metric from the subsequent payment card transactions associated with each of the fraud score range stripes. The computer-executable instructions also cause the at least one processor to determine a plurality of ratio striping values, each of the ratio striping values being a ratio of a first value of the at least one cumulative metric in a first of the fraud score range stripes from a first time period with respect to a second value of the at least one cumulative metric in the first fraud score range stripe from a second time period, wherein the second time period extends back farther in time than the first time period, and generate a set of feature inputs using the determined plurality of ratio striping values. The computer-executable instructions further cause the at least one processor to apply the set of feature inputs to update the first fraud scoring model, and score one or more real-time payment card transactions initiated using any payment card of the plurality of payment cards using the updated first fraud scoring model.

BRIEF DESCRIPTION OF THE DRAWINGS

FIG. 1 is a simplified block diagram of an example fraud analysis computing system for detecting fraudulent network events in a payment card interchange network by incorporating breach velocities into fraud scoring models in accordance with one example embodiment of the present disclosure.

FIG. 2 illustrates a graphical user interface generated by the computing system shown in FIG. 1.

FIG. 3 is a schematic diagram illustrating an example multi-party payment card industry system for enabling ordinary payment-by-card transactions in which merchants and card issuers do not necessarily have a one-to-one relationship.

FIG. 4 is a simplified block diagram of the fraud analysis computing system shown in FIG. 1 in communication with the payment interchange network shown in FIG. 3 in accordance with one embodiment of the present disclosure.

FIG. 5 illustrates an example configuration of a client system shown in FIG. 4.

FIG. 6 illustrates an example configuration of a server system shown in FIG. 4.

FIG. 7 shows an example configuration of the fraud analysis computing system shown in FIG. 1.

FIG. 8 is a flow diagram of a computer-implemented merchant profiling method for detecting fraudulent network transactions in a payment card transaction network by incorporating breach velocities into fraud scoring models.

DETAILED DESCRIPTION

Figure 1:
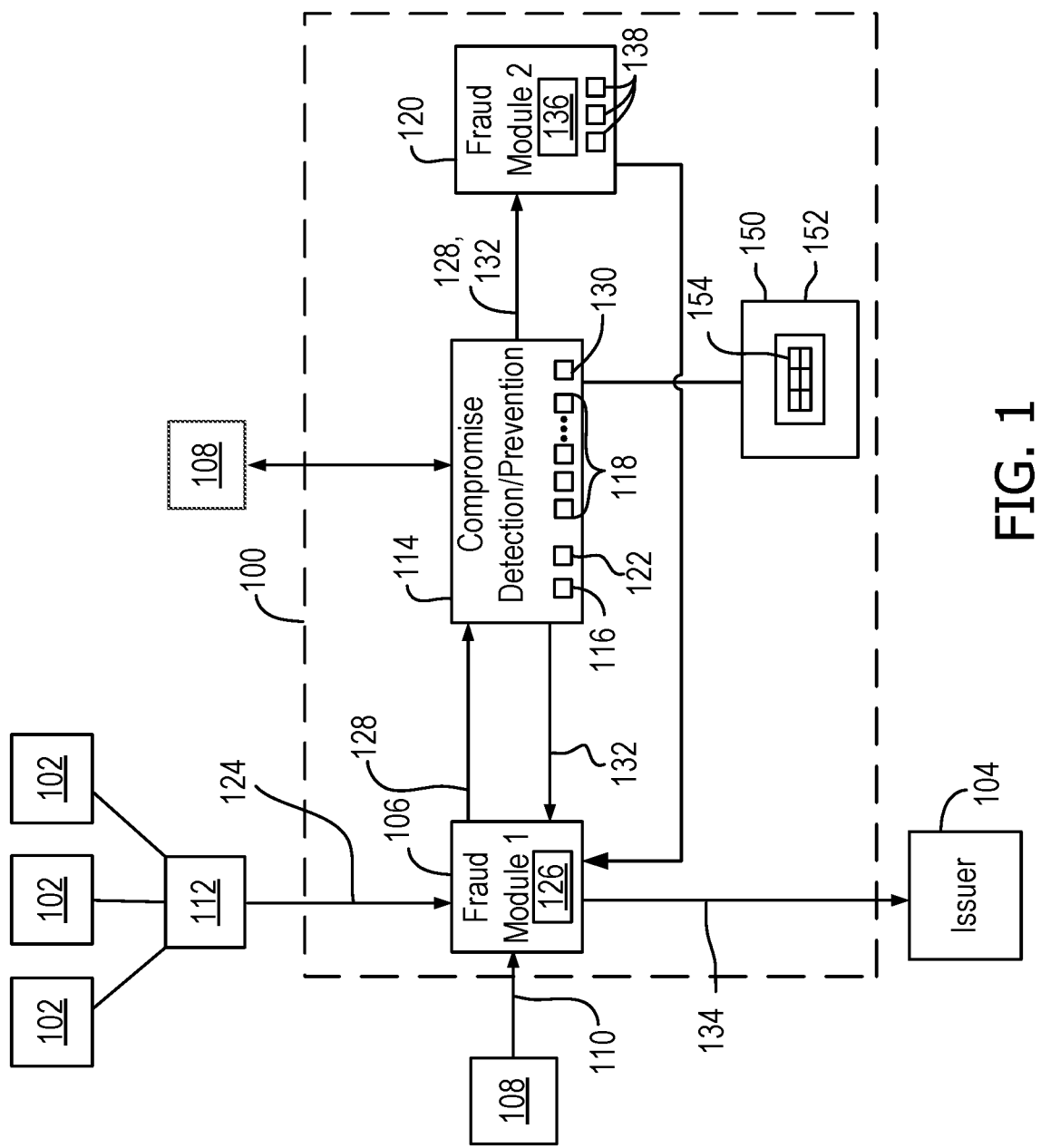
FIGS. 1-8 show example embodiments of the methods and systems described herein.

Embodiments of the present disclosure describe a fraud detection computer device and method implemented using a computing system that is in communication with a fraud detection system and a data warehouse associated with a payment card network. The methods and systems described herein utilize one or more fraud detection models in real time. Initially, payment card transaction authorization requests are scored on a per-transaction basis for a likelihood of the underlying payment card transaction being a fraudulent transaction. Using these preliminary scores, or using other fraud detection methods, a compromise event at a common point of compromise, e.g., a particular merchant physical location or a particular merchant website, is detected. For example, a compromised entity may experience a data breach, such that a plurality of payment cards are compromised. A plurality of payment cards that transacted at a compromised entity ("potentially compromised payment cards") are identified, and subsequent transaction activity thereof is monitored for fraud. When a data breach occurs that effects a large number of payment cards (that is, there are a large number of potentially compromised payment cards), it is not uncommon for the payment card data to be dispersed by the fraudsters in "waves." For example, the fraudsters may divide the compromised data and release the payment card data in waves or batches. In such cases, not all of the potentially compromised payment cards may experience fraudulent use at the same time. Rather, fraudulent transactions occur may in waves that follow the batched release of the payment card data.

A compromise detection and prevention (CDP) engine processes the subsequent transaction activity of the potentially compromised payment cards, to monitor for fraud waves, and produces additional data associated therewith. When the additional data indicates a potential new wave of fraudulent activity within the potentially compromised payment cards, the one or more fraud detection models are updated to score any transactions using the potentially compromised payment cards with a higher risk score, to more accurately and promptly minimize fraudulent use of any potentially compromised payment card (even if a specific payment card is not yet exhibiting fraudulent use).

Once the initial compromise is detected, the CDP engine retrieves or receives transactions records for payment cards that transacted with the compromised entity for a selected period of time following the compromise event (i.e., the potentially compromised payment cards). The CDP engine then monitors subsequent transaction activity (e.g., transactions that occur after the compromise event) of the potentially compromised payment cards for potential fraud. Specifically, the CDP engine receives payment card transaction authorization requests associated with the potentially compromised payment cards, or a representation of the payment card transaction authorization requests that do not have the full complement of data contained in payment card transaction authorization requests. For example, for personally identifiable information concerns, only a subset of the data in each payment card transaction authorization request may be transmitted to the CDP engine. This might be important if the CDP engine processing was performed by a third party service provider. In one embodiment, only the calculated fraud score and timestamp data from each authorization request is necessary for the CDP engine to give meaningful output data.

The CDP engine then performs various analyses on the subsequent transaction activity. The process of the CDP engine may be visualized on several graphs. Each graph shows data regarding payment card transaction authorization requests associated with the potentially compromised payment cards. The graph has an x-axis graduated in units of time and a y-axis graduated in units of fraud score. The payment card transaction authorization requests are displayed on the graph, metrics associated with the payment card transaction authorization requests in different zones of the graph are tracked, and ratios of the metrics are computed and processed to generate, when potential fraud is indicated, inputs into a fraud detection model. The inputs update the fraud module to refine the fraud analysis for the potentially compromised payment cards, that it, to increase the fraud risk scores for the potentially compromised payment cards during a potential fraud wave. Within each zone, for example, the CDP engine counts or tallies the number of payment card transaction authorization requests within the zone, determines the total value of the amounts (e.g., monetary amounts) of the payment card transaction authorization requests within the zone, and counts the number of declined payment card transaction authorization requests within the zone.

The zones may be defined by vertically extending lines intersecting the x-axis, defining time periods whose duration is predetermined or selectable, and by horizontally extending fraud score range stripes that intersect the y-axis of the graph. The time periods each extend back over a respective predetermined interval from a common starting point on the right-hand side of the x-axis, and thus overlap one another. In one example, the time periods may be set at certain fixed intervals. For example, the time periods could include six fixed intervals, which are fixed to enable the CDP engine to monitor durations of time immediately previous to a particular time (e.g., the present time or a time associated with a payment card transaction authorization request), with lengths of 15 minutes, 1 hour, 6 hours, 24 hours, 7 days, and 28 days. During a suspected fraud attack, the duration of the time periods may be modified "on-the-fly" to provide data that the CDP engine or machine learning algorithms need to fully ascertain parameters of the fraud attack. The fraud score range stripes may also overlap one another.

The zones may therefore each be an area of the graph defined by a particular time period and a particular fraud score range stripe, that is, by the intersection of one of the time periods and one of the fraud score range stripes. When the payment card transaction authorization requests are plotted on the graph, each will be associated with at least one of the zones of the graph. All the instances of the payment card transaction authorization requests that are in each zone can be tallied together, yielding a single value representing how many payment card transaction authorization requests of a certain fraud score range arrived within a certain time period for the potentially compromised payment cards. In addition, all of the amounts (e.g., monetary amounts) of the payment card transaction authorization requests that are in each zone can be totaled together, yielding a single value representing the total amount (e.g., the total dollar value) for the payment card transaction authorization requests within a certain fraud score range that arrived within a certain time period for the potentially compromised payment cards. Moreover, all of the payment card transaction authorization requests that are in each zone and which have already been declined or rejected can be counted, yielding a single value representing how many declined payment card transaction authorization requests within a certain fraud score range arrived within a certain time period for the potentially compromised payment cards. Additional or alternative cumulative metrics for the payment card transaction authorization requests in each zone may also be calculated.

Although the zones are described above as being defined graphically, in some embodiments the zones for the potentially compromised payment cards are defined and/or tracked by storing and parsing data structures (e.g., arrays, matrices, etc.) in a computer memory, without graphically displaying the zones and scored authorization requests.

Ratios developed from each metric, such as the tallies, totals, and decline counts, for any selected two of the time periods in a given fraud score range stripe may reveal information that helps detect fraud. For example, a ratio of two tallies of payment card transaction authorization requests from the same fraud score range stripe over different time periods reveals a change in payment card transaction authorization requests of similar fraud scores over the two time periods for the potentially compromised payment cards. For another example, a ratio of two total values of amounts of payment card transaction authorization requests from the same stripe over different time periods reveals a change in the total amount for the payment card transaction authorization requests of similar fraud scores over the two time periods for the potentially compromised payment cards. For another example, a ratio of two counts of declined payment card transaction authorization requests from the same stripe over different time periods reveals a change in the number of declined payment card transaction authorization requests of similar fraud scores over the two time periods for the potentially compromised payment cards.

As used herein, "ratio striping value" may refer to any ratio of tallies, totals, decline counts, or other suitable metric across a fraud score range stripe over two time periods, such as the above. Ratio striping values may be a confirmation of a suspected fraud attack determined by, for example, an upstream fraud detection model (e.g., a confirmation of the compromise event), may reveal a suspected fraud wave following an initial compromise event, or may provide additional information for a second or subsequent payment card fraud analysis. Notably, because each time period extends back from a common point in time and the denominator time period extends back farther, the ratio striping values will always fall between 0 to 1, and thus are "preconditioned" to serve as useful inputs into a fraud model and/or a machine learning algorithm implemented thereby. For example, if a ratio striping value is calculated for authorization requests preliminarily scored within a given fraud score range in the previous six hours as compared to over the previous twenty-four hours, any authorization requests for the fraud stripe in the previous six hour zone must also fall within the fraud stripe for the previous twenty-four hour zone, causing the ratio of the two values to fall on a scale from 0 to 1. The closer to a value of "1" the ratio is, the more likely it may be that a pattern of coordinated or otherwise related fraud attempts has begun. Moreover, tracking such an uptick in tallies, cumulative transaction amounts, and/or decline counts can detect fraud quickly even when the individually scored payment card transaction authorization requests are in a low-fraud-score stripe (e.g., when the type of fraud being perpetrated on merchants in a particular category is one in which few indicia of fraud are present in the characteristics of the individual transactions taken separately). In the example embodiment, these ratio striping values may reveal a potential fraud wave associated with only a subset of the potentially compromised payment cards.

The process of the CDP engine is useful in at least two ways in the analysis of the payment card transaction authorization requests. Once the CDP described above is complete, the CDP data may be used directly for trending and/or pattern recognition analysis to facilitate identifying a fraud attack or a subsequent fraud wave associated with at least a subset of the potentially compromised payment cards. The results of the trending and pattern recognition analysis may be output directly to an operator dashboard or transmitted to downstream analysis components or a fraud management system located remotely from the fraud detection computer device. In addition, the ratios of the metrics for two zones may be used to generate feature inputs to a downstream fraud detection model, such as one that applies machine learning algorithms. That is, the ratio striping values may be fed back into the fraud scoring model that scores authorization requests associated with the potentially compromised payment cards during, for example, a fraud wave, even when fewer than all of the potentially compromised payment cards are experiencing fraudulent use.

Therefore, this fraud detection computer device and method increases the effectiveness of payment card fraud detection. In the example embodiment, the CDP engine monitors the potentially compromised payment cards for potential fraud by tracking the ratio striping values therefor. Once potential fraud (e.g., a potential fraud wave affecting a subset of the potentially compromised payment cards) is detected, the CDP engine updates or modifies a fraud detecting module that scores incoming or real-time authorization requests to increase the fraud risk score of all potentially compromised payment cards.

In some alternative embodiments, first a fraud risk scoring model processes incoming payment card transaction authorization requests to assess a preliminary fraud risk score. The scored payment card transaction authorization requests, or some scored subset of the payment card transaction authorization requests, are transmitted to the CDP engine for additional processing. The output of the CDP engine is forwarded on to a downstream fraud detection model where machine learning algorithms use the output of the CDP engine to perform additional analyses of the CDP engine output.

Further, in some embodiments, a notification system may be triggered by a combination of one or more threshold-based alerts (e.g., alerts indicating the presence of multiple real-time, non-correlated statistical anomalies). For example, the system may provide a visual, email, text message, or other notification to analysts when a change in fraudulent transaction velocity has increased over certain time periods.

The technical problems addressed by this system include at least one of: (i) undetected network-based fraud events on a payment card transaction network, especially those affecting only a subset of previously or potentially compromised payment cards; (ii) increased network load based on some types of fraud events; (iii) computational burdens imposed by automated fraud monitoring systems; and (iv) too little contrast between fraudulent transactions and legitimate transactions in some time frames to make detection possible. Other technical problems addressed by the system and methods described herein may include increased network usage (slowing down the network) due to undetected frauds (e.g., systematic attacks to determine card verification numbers through trial and error).

The methods and systems described herein may be implemented using computer programming or engineering techniques including computer software, firmware, hardware, or any combination or subset thereof, wherein the technical effects may be achieved by performing at least one of the following steps: (a) detecting a potential compromise event, the potential compromise event associated with a compromised entity; (b) identifying a plurality of payment cards that initiated one or more payment card transactions at the compromised entity within a first selected time period associated with the potential compromise event; (c) reviewing all subsequent transaction activity for each of the plurality of payment cards for a second selected time period after the potential compromise event, the respective subsequent transaction activity for each payment card including one or more subsequent payment card transactions, each subsequent payment card transaction associated with a respective fraud score calculated using a first fraud scoring model; (d) generating a data structure that classifies each subsequent payment card transaction over a plurality of fraud score range stripes based on the respective fraud score; (e) parsing the data structure over a plurality of time periods, wherein each of the time periods extends back over a respective predetermined interval from a common starting point; (f) determining a plurality of ratio striping values, each of the ratio striping values being a ratio of a first value of the at least one cumulative metric in a first of the fraud score range stripes from a first time period with respect to a second value of the at least one cumulative metric in the first fraud score range stripe from a second time period, wherein the second time period extends back farther in time than the first time period; (g) generating a set of feature inputs using the determined plurality of ratio striping values; (h) applying the set of feature inputs to update the first fraud scoring model; (i) scoring one or more real-time payment card transactions initiated using any payment card of the plurality of payment cards using the updated fraud scoring model; (j) calculating the at least one cumulative metric including a tally of each subsequent payment card transaction scored within each fraud score range stripe over each of the plurality of time periods; (k) calculating the at least one cumulative metric including a cumulative total of transaction amounts of subsequent payment card transactions scored within each fraud score range stripe over each of the plurality of time periods; (l) calculating the at least one cumulative metric including a count of declined subsequent payment card transactions scored within each fraud score range stripe over each of the plurality of time periods; (m) tracking the tallies, total values, decline counts, and/or similar metrics using the data structure; and (n) displaying a graph of the scored payment card transaction authorization requests in a plurality of time periods and/or a plurality of fraud score range stripes, thereby enabling a user to visually analyze potentially fraudulent events in the payment card transaction network.

The resulting technical effect achieved by this system is at least one of: (i) reducing network-based fraud events through early detection; (ii) reducing network-based fraud events through multiple fraud detection methods; (iii) applying a cumulative fraud detection model to detect fraud within a subset of potentially compromised payment cards; (iv) updating an individual fraud scoring detection model for incoming payment card authorization requests associated with the prior to forwarding of the authorization requests to an issuer to increase the fraud risk scores thereof in real-time; (v) enabling visual network data views to detect fraud events; and (vi) eliminating economic loss through, e.g., early detection and reaction to fraudulent network events. Thus, the system enables enhanced fraud detection on the payment card transaction network. Once a pattern of fraudulent activity is detected and identified, further fraudulent payment card transaction attempts may be reduced or isolated from further processing on the payment card interchange network, which results in a reduced amount of fraudulent network traffic and reduced processing time devoted to fraudulent transactions, and thus a reduced burden on the network.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a "processor" may include any programmable system including systems using central processing units, microprocessors, micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The systems and processes are not limited to the specific embodiments described herein. In addition, components of each system and each process can be practiced independent and separate from other components and processes described herein. Each component and process can also be used in combination with other assembly packages and processes.

As used herein, the terms "payment card," "transaction card," and "financial transaction card" refer to any suitable payment card, such as a credit card, a debit card, a prepaid card, a charge card, a membership card, a promotional card, a frequent flyer card, an identification card, a prepaid card, a gift card, and/or any other payment device that may hold payment account information, such as mobile phones, smartphones, personal digital assistants (PDAs), key fobs, and/or computers. Each type of payment device can be used as a method of payment for performing a transaction.

As used herein, the term "fraud" is used in the context of payment card transactions and refers, generally, to an unprivileged use of a payment card. For example, a thief may steal a consumer's payment card or information from that payment card (e.g., a payment account number [PAN], expiration date, security code) and attempt to use the payment card for purchases. This type of transaction may be monitored by, for example, a fraud detection system within a payment network. Further, as used herein, a "suspected fraudulent transaction" is a payment card transaction that is suspected to be fraudulent, but which has not yet been confirmed as fraudulent by, for example, the consumer of the underlying payment card, or the issuing bank, or an analyst associated with the fraud detection system.

As used herein, the term "real-time" is used, in some contexts, to refer to a regular updating of data within a system such as the fraud detection systems, the fraud management systems, and/or the displays described herein. When a system is described as processing or performing a particular operation "in real-time," this may mean within seconds or minutes of an occurrence of some trigger event, such as new data being generated, or on some regular schedule, such as every minute. In other contexts, some payment card transactions require "real-time" fraud operations, such as fraud scoring, which refers to operations performed during authorization of a payment card transaction (i.e., between the moment that a new payment card transaction is initiated from, for example, a merchant, and the time that an authorization decision is made, for example, back to that merchant). In such a context, "near real-time" fraud operations are operations conducted shortly after the payment card transaction has occurred (i.e., after an authorization decision is made).

As used herein, transaction velocity generally relates to a number of qualifying transactions initiated by one or more consumers using one or more payment devices over a selected period of time, where the transactions qualify if they meet one or more qualifying criteria (e.g., having a fraud score within a certain fraud score range, being made at a particular merchant or group of merchants, being associated with a particular issuer or group of issuers).

The following detailed description illustrates embodiments of the disclosure by way of example and not by way of limitation. It is contemplated that the disclosure has general application to fraud management of payment card transactions.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic block diagram of a fraud analysis computing system 100 operating to identify large-scale fraudulent activity and to monitor compromised payment cards. For example, a particular merchant 102 may experience a data breach, such that a plurality of payment cards are compromised. That is, personally identifiable information or payment card data has been captured by fraudsters. Fraudsters may sell or use the payment card data for the compromised cards, leading to large number of fraudulent transactions initiated using the plurality of compromised payment cards. For example, fraudsters may introduce fraudulent transactions through one or more other merchants 102 (which may or may not include the compromised merchant 102) in an attempt to deceive an issuer 104 into authorizing a transaction with a compromised payment card that is not owned and/or controlled by the person presenting the payment card at a time of purchase. Fraud analysis computing system 100 monitors transactions for fraudulent activity.

Figure 3:
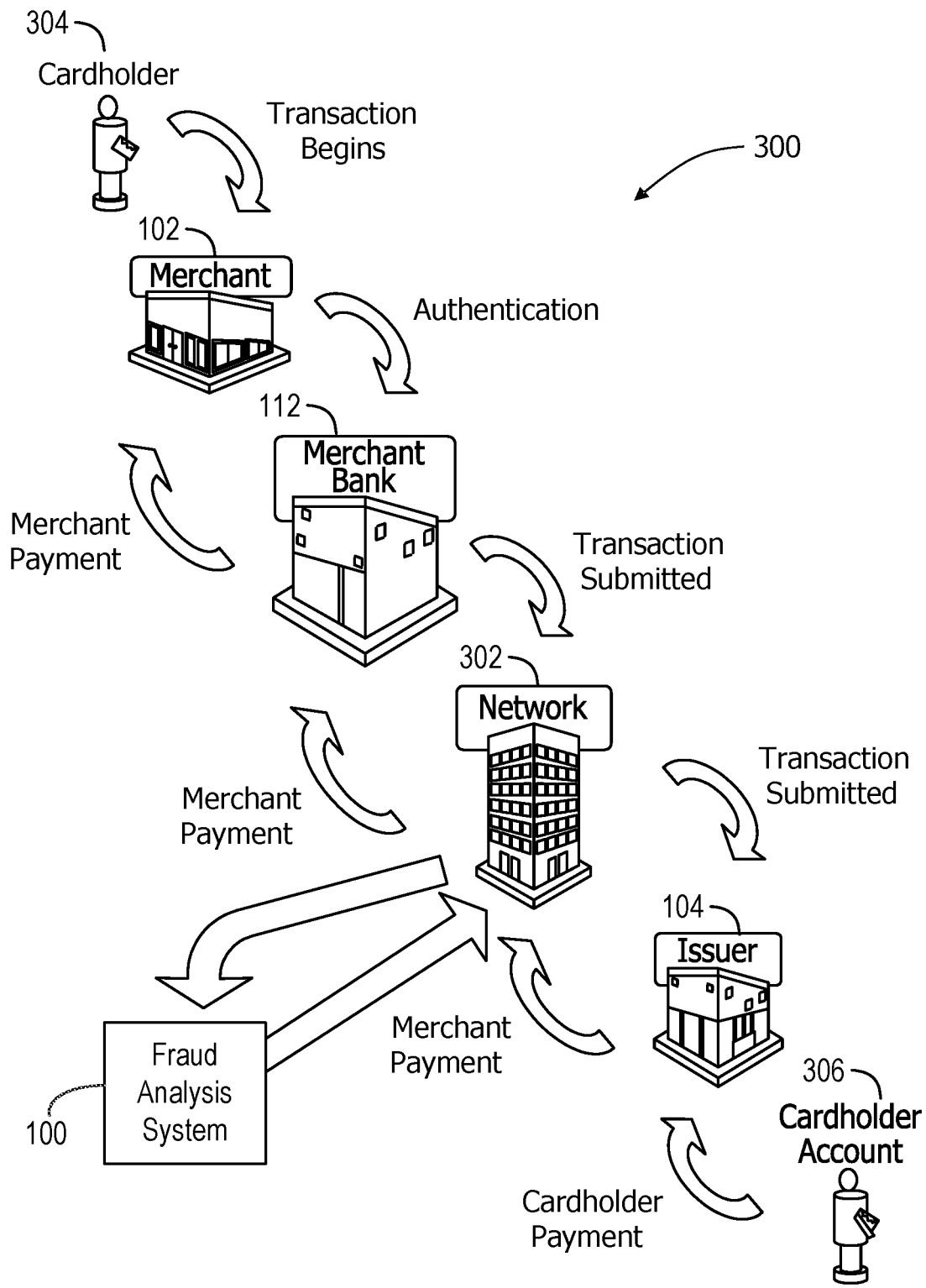

Fraudulent transactions may strain the processing and network resources of a payment card interchange network 302 (see FIG. 3). For example, some types of attempted fraud include a large number of attempted online transactions in a short period of time, which may limit a bandwidth of payment card interchange network 302 that is available for legitimate transactions. For another example, fraudulent transactions that are not detected prior to authorization by issuer 104 may result in additional activity over payment card interchange network 302 such as voids, rollbacks of cleared and settled transactions, and so forth, which may reduce processing speed and bandwidth available for legitimate transactions.

In the example embodiment, fraud analysis computing system 100 includes a first fraud detection module 106. First fraud detection module 106, in the example embodiment, is communicatively coupled to at least one database 108 that stores transaction records, such as completed payment card transaction authorization requests 110. First fraud detection module 106 may additionally or alternatively be communicatively coupled to a plurality of merchants 102 directly or through at least one merchant bank 112.

A compromise detection and prevention (CDP) engine 114, including a processor 116, is communicatively coupled to database 108, and to a first, or upstream, fraud detection module 106 and is configured to generate a plurality of data structures 118. In some embodiment, fraud analysis computing system 100 also includes a second, or downstream, fraud detection module 120 communicatively coupled to CDP engine 114, as described further herein. In some embodiments, two or more of first fraud detection module 106, CDP engine 114, and second fraud detection module 120 are implemented on a common computing platform. In alternative embodiments, each of first fraud detection module 106, CDP engine 114, and second fraud detection module 120 are implemented on separate computing platforms and coupled together in electronic communication.

In the example embodiment, fraud analysis computing system 100 is configured to detect and/or to receive notification of an occurrence of a potential compromise event associated with a common point of compromise (CPC) or comprised entity. The compromised entity may include, for example, a merchant 102, a merchant bank 112, an issuer 104, or any other entity. In some embodiments, CDP engine 114 detects the potential compromise event using the ratio striping analyses described further herein. Fraud analysis computing system 100 may use additional or alternative analyses to detect or identify a potential compromise event and/or verify a compromised entity, such as the methods described in U.S. Pat. No. 7,580,891 and/or U.S. patent application Ser. No. 15/794,899, the contents of which are hereby incorporated by reference herein. Additionally or alternatively, CDP engine 114 detects the potential compromise event by receiving a notification that the potential compromise event has occurred, such as from the compromised entity, the interchange network 302, and/or any other entity.

CDP engine 114 identifies a plurality of payment cards that initiated one or more payment card transactions at the compromised entity within a first selected time period associated with the potential compromise event. These payment cards may be referred to as "potentially compromised payment cards." For example, CDP engine 114, upon detecting the potential compromise event, retrieves (e.g., from database 108) transaction records, such as stored, completed payment card transaction authorization requests, associated with the compromised entity for the first selected time period. The first selected time period is a time period prior to the potential compromise event. Alternatively, the first selected time period include the time of potential compromise event and/or time thereafter. CDP engine 114 parses the transaction records to identify all payment cards that initiated one or more payment card transactions at the compromised entity that may thus be vulnerable to fraudulent use. CDP engine 114 builds a list 122 of these potentially compromise payment cards. These potentially compromised payment cards may have been used to conduct fraudulent transactions, may be used to conduct fraudulent transactions in the future, and/or may be otherwise compromised.

CDP engine 114 is configured to review and monitor the subsequent transaction activity of the potentially compromised payment cards; that is, the transaction activity of each of the potentially compromised payment cards that occurs after the potential compromise event. Some subsequent transaction activity following the potential compromise event may have already occurred by the time CDP engine 114 detects the potential compromise event. Accordingly, CDP engine 114 may review completed transaction activity (e.g., stored payment card transaction authorization requests) according to the ratio striping analyses described herein. Other subsequent transaction activity to be monitored occurs after CDP engine 114 has detected the potential compromise event and is monitored in real-time or near real-time according to the ratio striping analyses described herein.

In the example embodiment, first fraud detection module 106 is configured to receive a plurality of payment card transaction authorization requests 124 associated with any of the potentially compromised payment cards, from plurality of merchants 102 either directly or from the at least one merchant bank 112. In various embodiments, payment card transaction authorization requests 124 are received by payment card interchange network 302 and forwarded to first fraud detection module 106. First fraud detection module 106 is configured to analyze each of the received plurality of payment card transaction authorization requests 124 on an individual basis (that is, without regard to characteristics of other incoming payment card transaction authorization requests) for fraud, and to assign a fraud score to each of the plurality of payment card transaction authorization requests 124. Additionally, first fraud detection module 106 is configured to analyze stored payment card transaction authorization requests 110 associated with any of the potentially compromised payment cards on an individual basis for fraud, and to assign a fraud score to each stored payment card transaction authorization request 110. In some embodiments, stored payment card transaction authorization requests 110 may already include a score, such as a score calculated using first fraud detection module 106 (or any other fraud scoring component) while that payment card transaction authorization request 110 was being initially processed. In such cases, first fraud detection module 106 may calculate a fraud score for such a stored payment card transaction authorization requests 110 or may detect the existing fraud score and not perform additional scoring.

In one example embodiment, first fraud detection module 106 executes a first fraud scoring model 126 to analyze and score payment card transaction authorization requests 124 and/or stored payment card transaction authorization requests 110. The fraud score is indicative of a likelihood of fraud being associated with a respective one of the payment card transaction authorization requests 110, 124. First fraud scoring model 126 is executed using a first or preliminary set of rules or parameters.

Scored payment card transaction authorization requests 128 are transmitted to CDP engine 114. That is, CDP engine 114 receives for review and monitoring all subsequent transaction activity (represented by scored payment card transaction authorization requests 128) for each of the plurality of payment cards. CDP engine 114 may review monitor subsequent transaction activity for a second selected time period after the potential compromise event. The second selected time period may include any amount of time after the potential compromise event, such as one week, one month, six months, one year, etc. Moreover, the second selected time period need not always start at the time of the potential compromise event but rather may be a rolling time period thereafter, or may extend from any suitable starting point to any suitable end point.

CDP engine 114 is configured to generate a respective data structure 118 that sorts the scored payment card transaction authorization requests 128 over a plurality of fraud score range stripes. That is, CDP engine 114 generates a data structure 118 that classifies each scored payment card transaction authorization request 128 over the plurality of fraud score range stripes based on the respective fraud score thereof. CDP engine 114 may generate an individual data structure 118 for each potentially compromised payment card, for groups of potentially compromised payment cards, and/or for all potentially compromised payment cards.

Each of the fraud score range stripes ranges from a respective upper fraud score threshold to a respective lower fraud score threshold. In some embodiments, at least two of the fraud score range stripes overlap, such that a particular scored payment card transaction authorization request may be stored in two locations in the corresponding data structure 118 (corresponding to the two overlapping fraud score range stripes).

CDP engine 114 is further configured to parse each data structure 118 over a plurality of time periods and calculate, for each of the time periods, at least one cumulative metric from the scored payment card transaction authorization requests 128. In addition, CDP engine 114 is configured to determine a ratio of a first value of the metric in a first fraud score range stripe from a first time period with respect to a second value of the metric in the first fraud score range stripe during a second time period, wherein the second time period extends back farther in time than the first time period (i.e., a ratio striping value for the first and second time periods for the particular fraud score range stripe).

In the example embodiment, data structure 118 is parsed to determine a tally or number of all scored payment card transaction authorization requests 128 within each fraud score range stripe over each of the plurality of time periods for the potentially compromised payment cards. CDP engine 114 is also configured to determine a plurality of ratio striping values of a first tally in a first stripe from a first time period with respect to a second tally in the first stripe during a second time period.

In the example embodiment, data structure 118 is also parsed to determine a cumulative total of the transaction amounts of all payment card transaction authorization requests scored within each fraud score range stripe over each of the plurality of time periods for the potentially compromised payment cards. CDP engine 114 is also configured to determine a plurality of ratio striping values of a first total in a first stripe from a first time period with respect to a second total in the first stripe during a second time period.

In the example embodiment, data structure 118 is further parsed to determine a count of the declined payment card transaction authorization requests scored within each fraud score range stripe over each of the plurality of time periods (e.g., a "decline count") for the potentially compromised payment cards. For example, "declined" payment card transaction authorization requests are those declined or rejected by an issuing bank, such as issuer 104. CDP engine 114 is also configured to determine a plurality of ratio striping values of a first decline count in a first stripe from a first time period with respect to a second decline count in the first stripe during a second time period.

In the example embodiment, as large numbers of scored payment card transaction authorization requests 128 continue to be received by CDP engine 114, the common starting point of the time periods used by CDP engine 114 to compute ratio striping values is updated to a more recent time in order to consider the most recent payment card transaction authorization requests in the fraud analysis. Due to the structure of data structures 118, CDP engine 114 simply re-parses existing data structures 118, rendering the ratio striping values derived therefrom amenable to rapid storage, calculation, and updating, enabling fraud detection by first fraud detection module 106 and/or second fraud detection module 120 (both described further herein) to be updated frequently, and in some embodiments in near real time. The use of data structures 118 thus provides an advantage over at least some known fraud detection systems. In some embodiments, older scored payment card transaction authorization requests 128 are correspondingly purged from data structure 118 as they age out of a longest time period 214 (see FIG. 2) that CDP engine 114 is configured to consider. In alternative embodiments, CDP engine 114 is configured to parse data structures 118 to obtain any suitable combination of these or other metrics derived for scored payment card transaction authorization requests 128 within each fraud score range stripe over each of the plurality of time periods, and CDP engine 114 is also configured to determine a plurality of ratios of a first value of each metric in a first stripe from a first time period with respect to a second value in the first stripe during a second time period.

In the example embodiment, CDP engine 114 performs the ratio striping calculations on data structure 118 to monitor the potentially compromised payment cards for fraud waves. For example, CDP engine 114 generates at least one threshold ratio striping value 130 indicative of normal or baseline use across all potentially compromised payment cards. CDP engine 114 may generate a threshold ratio striping value 130 for each cumulative metric (e.g., a threshold ratio striping value 130 for each of the tally, amount, and decline count). CDP engine 114 compares the calculated ratio striping value(s) for data structure 118 to threshold ratio striping value(s) 130. Exceeding threshold ratio striping value(s) 130 may be an indicator of a fraud wave. As such, CDP engine 114 is configured to identify when the potentially compromised cards may be experiencing a fraud wave using the ratio striping values, even though only a portion of the potentially compromised cards may be experiencing actual fraudulent use.

In some embodiments, CDP engine 114 is configured to transmit a fraud wave alert (not shown) upon detecting the potential fraud wave (e.g., upon the calculated ratio striping value(s) exceeding threshold ratio striping value(s) 130).

CDP engine 114 may transmit an alert to user(s) associated with the potentially compromised payment cards, an issuer 104 of the potentially compromised payment cards, the compromised entity, and/or any other associated entity. The alert may indicate that a potential fraud wave is ongoing and recommend monitoring affected payment cards for fraudulent activity.

CDP engine 114 is further configured to generate feature inputs 132 based on the calculated ratio striping values. In the example embodiment, the set of feature inputs 132 are used to update or modify parameters of first fraud scoring model 126. The set of feature inputs 132 may include the ratio striping values and/or additional or alternative fraud risk scoring parameters. First fraud detection module 106 updates or modifies first fraud scoring model 126 using the set of feature inputs 132. Feature inputs 132 affect the operation of first fraud detection module 106 by changing parameters of first fraud scoring model 126 that are applied to incoming payment card transaction authorization requests 124 associated with the potentially compromised payment cards. In other words, operation of first fraud detection module 106 changes based on the generated set of feature inputs 132, that is, as the generated set of feature inputs 132 changes. First fraud detection module 106 then uses the updated fraud scoring model 126 to score new transactions (i.e., payment card transaction authorization requests 124) received from merchants 102 and/or acquirers 112. In the example embodiment, the set of feature inputs 132, when implemented to update the first fraud scoring model 126, cause payment card transaction authorization requests 124 for transactions initiated using any of the potentially compromised payment cards to be scored as having a higher fraud risk, specifically during a suspected fraud wave.

Specifically, first fraud detection module 106 receives a payment card transaction authorization request 124 associated with a potentially compromised payment card. First fraud detection module 106 executes the updated fraud scoring model 126 to analyze and score the payment card transaction authorization request 124. First fraud scoring model 126 is executed using a second or updated set of rules or parameters based on the set of feature inputs 132 from CDP engine 114 such that a corresponding scored payment card transaction authorization request 134 transmitted to issuer 104 has a higher associated risk score, due to the ongoing fraud wave. That is, fraud analysis computing system 100 leverages the ratio striping values to modify the fraud risk scores for new transactions initiated using any of the potentially compromised payment cards to more accurately identify potential fraud and reduce the risk of fraudulent transactions being authorized.

In some embodiments, the calculated ratio striping value(s) exceeding the threshold ratio striping value(s) triggers CDP engine 114 to transmit the feature inputs 132 to first fraud detection module 106 to initiate updating first fraud scoring model 126. Upon receiving the feature inputs 132, first fraud detection module 106 applies the feature inputs 132 to first fraud scoring model 126 to update first fraud scoring model 126. In other embodiments, CDP engine 114 feeds features inputs 132 to first fraud detection module 106 at regular intervals, or upon receiving instruction from an operator of fraud analysis computing system 100 (e.g., based on the operator's viewing of a graphical user interface 150).

Additionally or alternatively, the set of feature inputs 132 are used to update or modify parameters of a second fraud scoring model 136 executed by second fraud detection module 120 to detect attempted fraud other than the initial compromise event. That is, second fraud scoring model 136 applies the updated or modified parameters to scored payment card transaction authorization requests 128 (including scored payment card transaction authorization requests 128 associated with other payment cards than the potentially comprised payment cards), facilitating the identification of potential occurrences of multiple related payment card transaction fraud attempts over payment card interchange network 302. In some embodiments, second fraud detection module 120 includes or executes a plurality of machine learning algorithms 138, either separate from execution of second fraud scoring model 136 or as part of second fraud scoring model 136. In various embodiments, machine learning algorithms 138 may be selectable, either automatically or by an operator, and may include at least one of an Artificial Neural Network (ANN) machine learning algorithm and a Support Vector Machine (SVM) machine learning algorithm. Second fraud detection module 120 may be configured to execute multiple machine learning algorithms 138 singly or simultaneously in groups.

Feature inputs 132 affect the operation of second fraud detection module 120 by changing parameters of second fraud scoring model 136 that are applied to scored payment card transaction authorization requests 128. In other words, operation of second fraud detection module 120 changes based on the generated set of feature inputs, that is, as the generated set of feature inputs 132 changes. For example, feature inputs 132 are used to train machine learning algorithms 138. In some embodiments, feature inputs 132 generated by CDP engine 114 are used to adjust node weights applied by second fraud detection module 120 to external inputs (e.g., scored payment card transaction authorization requests 128) to, or internal signals (e.g., intra-node signals) within, second fraud scoring model 136 and/or the machine learning algorithms 138. Additionally or alternatively, feature inputs 132 are provided as input signals into machine learning algorithms 138.

Second fraud detection module 120 is configured to perform at least one of: alerting merchant 102, merchant bank 112, issuer 104, or other entity associated with a particular data structure 118 or the compromise event to a potential ongoing coordinated fraud attempt; calculating reweighted fraud scores for the scored payment card transaction authorization requests 128 based on at least one of the initial fraud scores caucused by first fraud detection module 106 and feature inputs 132, prior to forwarding the payment card transaction authorization requests to issuer 104; generating an approve or decline recommendation for a payment card transaction authorization request based on at least one of an initial fraud score, a reweighted fraud score, and feature inputs 132; and flagging payment card transaction authorization requests 124 associated with merchant 102, merchant bank 112, issuer 104, or other entity associated with the potential ongoing coordinated fraud attempt for other special handling.

In some embodiments, the use of the ratio striping values to generate feature inputs 132 for first and/or second fraud detection module(s) 106, 120 further increases a processing speed of fraud analysis computing system 100. For example, the time periods used to define data structures 118 are selected as progressively longer time bands extending backward in time from a common starting point, such as the current time or the time stamp of a payment card transaction authorization request currently being processed, causing each of the ratio striping values as generated to lie between 0 and 1. Values ranging between 0 and 1 are easily conditioned to serve as feature inputs 132 (e.g., node weights) for machine learning algorithms 128, thus avoiding a need for time- and resource-consuming additional processing by CDP engine 114 to generate feature inputs 132. In some embodiments, feature inputs 132 are set to equal the ratio striping values, such that the ratio striping values are provided directly to first and/or second fraud detection module(s) 106, 120 for updating or modifying first and/or second fraud scoring model(s) 126, 136. In other such embodiments, CDP engine 114 provides limited additional conditioning of the ratio striping values to generate feature inputs 132, such as by squaring each of the ratio striping values to generate corresponding feature inputs 132. For example, the further conditioning, such as by squaring the values, facilitates increasing a stability of feature inputs 132, by reducing an effect of transient spikes in the ratio striping values on the value of the corresponding feature inputs 132. In alternative embodiments, feature inputs 132 are calculated from the ratio striping values in any suitable fashion.

In some embodiments, fraud analysis computing system 100 is configured to operate CDP engine 114 over a first time segment using a first set of time periods and/or fraud score range stripes to generate the plurality of ratio striping values, and in response to detecting a fraud wave (e.g., upon threshold ratio striping value(s) 130 being exceeded), to select a second set of time periods and/or fraud stripe ranges to generate the plurality of ratio striping values going forward after the end of the first time segment. In alternative embodiments, CDP engine 114 selects a different set of time periods and/or fraud stripe ranges in response to a signal originating from an operator of fraud analysis computing system 100 (e.g., based on the operator's viewing of graphical user interface 150), automatically from another component of fraud analysis computing system 100, or from an external system or component.

Figure 2:
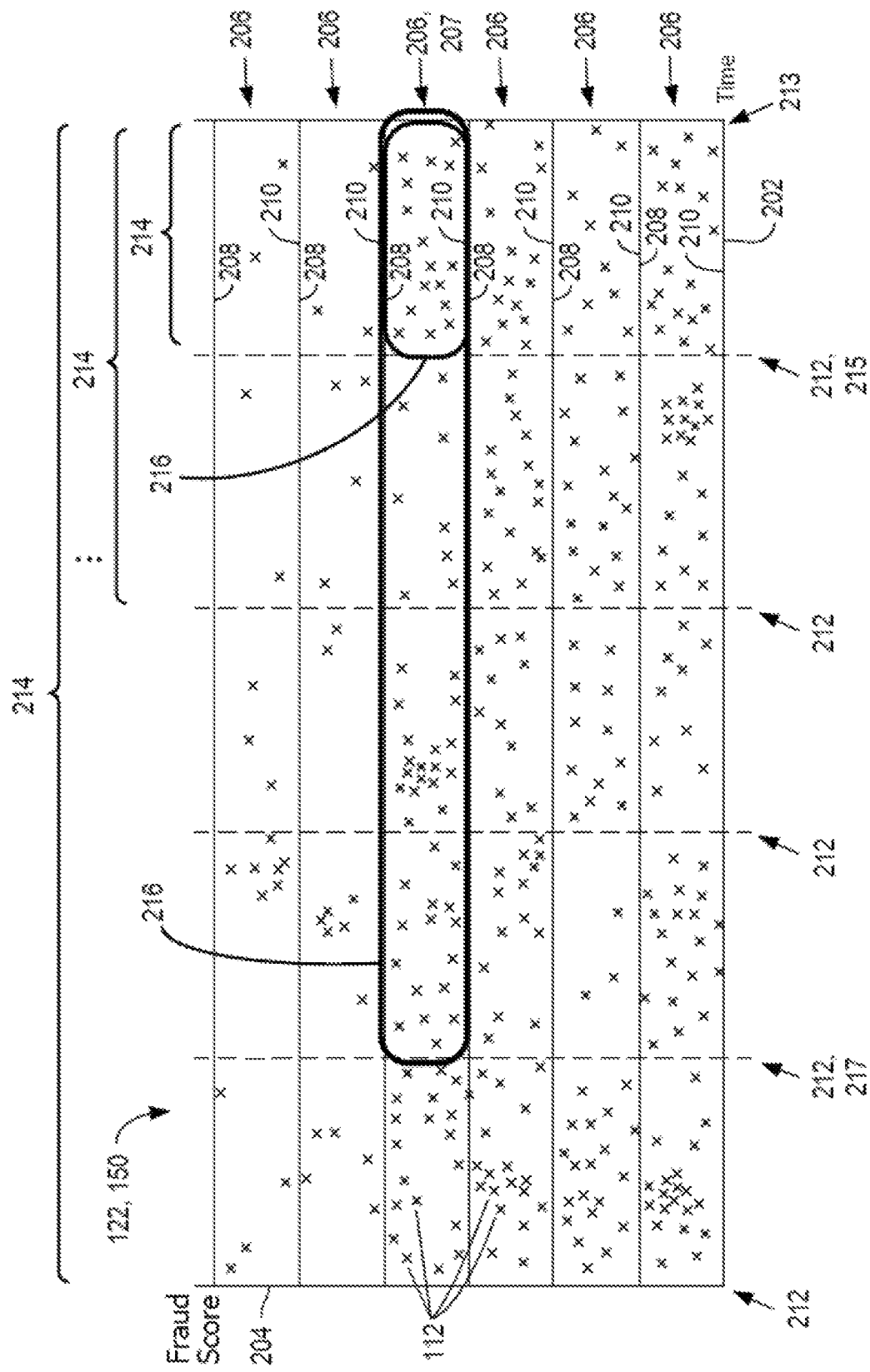

In various embodiments, fraud analysis computing system 100 further includes graphical user interface 150 configured to display information to a user in real time through a dashboard application 152. For example, graphical user interface 150 is displayable on a display screen of a client system 414 (shown in FIG. 4). FIG. 2 illustrates graph 154 displayed on graphical user interface 150. With reference to FIGS. 1 and 2, in the example embodiment, graph 154 includes an x-axis 202 graduated in units of time and a y-axis 204 graduated in units of fraud score. Typically, fraud scores are presented on a 0-100 or 0-1000 unit scale. Graph 154 displays horizontal fraud score range stripes 206, each delineated by a respective upper fraud score threshold 208 and a respective lower fraud score threshold 210.

Graph 154 also displays vertically extending time period boundaries 212 that intersect x-axis 202 and define a corresponding plurality of time periods 214. More specifically, each time period 214 is defined from a current analysis time 213 (e.g., the present time, a timestamp associated with a payment card transaction authorization request most recently added to data structures 118, or any other selected or predetermined origin time) back to one of time period boundaries 212. In one example, during monitoring of the incoming scored payment card transaction authorization requests 124 (and/or other review of the subsequent transaction activity of the potentially compromised payment cards), time boundaries 212 may be set at certain fixed intervals with respect to current analysis time 213. For example, time period boundaries 212 could define six fixed intervals, which are fixed to enable analysis of time durations immediately previous to current analysis time 213, with lengths of 15 minutes, 1 hour, 6 hours, 24 hours, 1 days, and 28 days. During a suspected fraud attack a location of time period boundaries 212 may be modified "on-the-fly" to provide data that better enables CDP engine 114, first fraud detection module 106, or machine learning algorithms 138 to ascertain parameters of the fraud attack.

In the example embodiment, CDP engine 114 provides for display on graph 154 each incoming scored payment card transaction authorization request 124 and/or retrieved payment card transaction authorization request 110, plotted by fraud score and time stamp. As time advances, new transactions are added at the right-hand side of graph 154, while older transactions scroll off of the left-hand side. Such older transactions may be deleted from respective data structures 118 or may merely not be further counted in analyses. Graph 154 thus provides a visual indication to a user of how the tally of payment card transaction authorization requests in each fraud score range stripe 206 is changing over time. Moreover, in certain embodiments, a transaction amount associated with each plotted payment card transaction authorization request is represented proportionally by a size and/or color (e.g., ranging from blue or "cold" for smaller transaction amounts to red or "hot" for higher transaction amounts) of the symbol used on graph 154. Additionally or alternatively, graphical user interface 150 displays declined payment card transaction authorization requests on graph 154 using a different color for the symbol and/or a different type of symbol. In some embodiments, graphical user interface 150 enables the user to select among one or more metrics, and method of display of each metric, for display on graph 154. Thus, graphical user interface 150 provided by CDP engine 114 and/or dashboard application 152 enables the user to draw inferences about patterns of fraudulent activity that may be occurring with respect to the potentially compromised payment cards (e.g., a fraud wave), even for payment card transaction authorization requests that have been scored individually as having low risk of fraud.

In alternative embodiments, CDP engine 114 does not provide graph 154. Nevertheless, graph 154 provides a useful visual illustration of zones 216 for which cumulative metrics, based on information in the scored payment card transaction authorization requests in each fraud score stripe 206, are calculated by CDP engine 114 as discussed above. More specifically, data regarding scored payment card transaction authorization requests 128 stored in data structures 118 is parsed over each time period 214 for each fraud score stripe 206, and the cumulative metrics are calculated for the respective zone 216.

For purposes of illustration, two zones 216 are illustrated in FIG. 2. A first zone 216 extends from current analysis time 213 back to a first time period boundary 215, a second zone 216 extends from current analysis time 213 back to an earlier second time period boundary 217, and both zones are bounded within a particular fraud stripe 207 of the plurality of fraud score range stripes 206. For example, but not by way of limitation, first time period boundary 215 defines a backward-looking time interval of six hours and second time period boundary 217 defines a backward-looking time interval of twenty-four hours. CDP engine 114 parses data structure 118 for payment card transaction authorization requests scored within fraud score range stripe 207 and time stamped between current analysis time 213 and first time period boundary 215. In the example embodiment, data structure 118 includes payment card transaction authorization requests pre-sorted into fraud score range stripes 206, enabling the time parsing process for the first and second illustrated zones 216 to operate solely on transactions within fraud score range stripe 207, thereby increasing a speed of the parsing process, which advantageously enables CDP engine 114 to continuously update the metrics for each zone

216 as time moves forward and the time stamps of payment card transaction authorization requests in each data structure 118 are correspondingly shifted across time period boundaries 212.

In the example embodiment, CDP engine 114 calculates the tally, total amount, and decline count of the identified payment card transaction authorization requests and associates these metrics with the first zone 216. Similarly, CDP engine 114 parses the portion of data structure 118 that includes payment card transaction authorization requests scored within fraud score range stripe 207 to identify payment card transaction authorization requests that are time stamped between current analysis time 213 and second time period boundary 217. CDP engine 114 calculates the tally, total amount, and decline count of the identified payment card transaction authorization requests and associates these metrics with the second zone 216. In the example embodiment, CDP engine 114 further calculates the ratio striping values associated with fraud score range stripe 207, the first zone 216, and the second zone 216 as the ratio of the tally (i.e., number of transactions) in the first zone 216 to the tally in the second zone 216, the ratio of the total amount of transactions in the first zone 216 to the total amount of transactions in the second zone 216, and the ratio of the count of declined transactions in the first zone 216 to the count of declined transactions in the second zone 216. CDP engine 114 may perform similar operations for each pair of time periods 214 within fraud score range stripe 207, and for each pair of the plurality of time periods 214 for other fraud score range stripes 206. It should again be noted that the speed advantages provided by sorting scored payment card transaction authorization requests 128 into data structures 118, and in some embodiments by further sorting the payment card transaction authorization requests in each data structure 118 by fraud score range stripe 206, enable CDP engine 114 to perform these operations in near real time for the extremely large number of payment card transaction authorization requests 124 that are processed by payment card interchange network 302.

One measurement of potential fraudulent activity directly uses the ratio striping values based on tallies, total values, or decline counts of payment card transaction authorization requests from the same fraud score range stripe 206 over a pair of time periods 214. For example, a ratio of the tallies from the first zone 216 to the second zone 216 reveals a change in payment card transaction authorization requests of similar fraud scores between the two time periods under consideration. As another example, a ratio of the total transaction amounts from the first zone 216 to the second zone 216 reveals a change in the total value of the amounts for payment card transaction authorization requests of similar fraud scores between the two time periods. As yet another example, a ratio of the decline counts from the first zone 216 to the second zone 216 reveals a change in declined payment card transaction authorization requests of similar fraud scores between the two time periods for potentially compromised payment cards. The CDP data as embodied in the ratio striping values is useful in at least two ways. The ratio striping values by themselves may demonstrate trending and/or patterns that facilitate identifying a fraud wave or confirming a suspected fraud attack (e.g., the initial compromise event) previously determined by, for example, an upstream fraud detection model. The results of the trending and pattern recognition analysis may be output directly to graphical user interface 150 or transmitted to downstream analysis components or a fraud management system located remotely from the fraud analysis computer system 100.

Additionally or alternatively, the ratio striping values may provide the basis for inputs into a second or subsequent payment card fraud analysis, and are particularly well-suited to serve as inputs into machine learning algorithms, as described above with respect to second fraud detection module 120. In some embodiments, second fraud detection module 120 learns to detect underlying relationships between actual fraud events and ratio striping values associated with various zones 216 that may be difficult to detect by a human operator.

In some embodiments, as noted above, fraud analysis computer system 100 is implemented as part of, or in association with, a payment card interchange network 302. FIG. 3 is a schematic diagram illustrating an example multi-party payment card industry system 300 for enabling ordinary payment-by-card transactions in which merchants 102 and issuer banks 104 do not need to have a one-to-one special relationship. Embodiments described herein may relate to a payment card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical payment card system, a financial institution called the "issuer" issues a payment card, such as a credit card, to a consumer or cardholder 304, who uses the payment card to tender payment for a purchase from merchant 102. To accept payment with the payment card, merchant 102 must normally establish an account with a financial institution that is part of the financial payment system. This financial institution is usually called the "merchant bank," the "acquiring bank," or the "acquirer." When cardholder 304 tenders payment for a purchase with a payment card, merchant 102 requests authorization from an acquirer or merchant bank 112 for the amount of the purchase. The request may be performed over the telephone, but is usually performed through the use of a point-of-sale terminal, which reads cardholder's 304 account information from a magnetic stripe, a chip, or embossed characters on the payment card and communicates electronically with the transaction processing computers of merchant bank 112. Alternatively, merchant bank 112 may authorize a third party to perform transaction processing on its behalf. In this case, the point-of-sale terminal will be configured to communicate with the third party. Such a third party is usually called a "merchant processor," an "acquiring processor," or a "third party processor."

Using payment card interchange network 302, computers of merchant bank 112 or merchant processor will communicate with computers of issuer bank 104 by sending a payment card transaction authorization request. Based on the payment card transaction authorization request, issuer 104 determines whether cardholder's 304 account 306 is in good standing and whether the purchase is covered by cardholder's 304 available credit line. Based on these determinations, the request for authorization will be declined or accepted by issuer 104. If the request is accepted, an authorization code is issued to merchant 102.

When a request for authorization is accepted, the available credit line of cardholder's 304 account 306 is decreased. Normally, a charge for a payment card transaction is not posted immediately to cardholder's 304 account 306 because bankcard associations, such as Mastercard International Incorporated®, have promulgated rules that do not allow merchant 102 to charge, or "capture," a transaction until goods are shipped or services are delivered. However, with respect to at least some debit card transactions, a charge may be posted at the time of the transaction. When merchant 102 ships or delivers the goods or services, merchant 102 captures the transaction by, for example, appropriate data entry procedures on the point-of-sale terminal. This may include bundling of approved transactions daily for standard retail purchases. If cardholder 304 cancels a transaction before it is captured, a "void" is generated. If cardholder 304 returns goods after the transaction has been captured, a "credit" is generated. Payment card interchange network 302 and/or issuer bank 104 stores the payment card information, such as a type of merchant, amount of purchase, date of purchase, in a database 420 (shown in FIG. 4).

After a purchase has been made, a clearing process occurs to transfer additional transaction data related to the purchase among the parties to the transaction, such as merchant bank 112, payment card interchange network 302, and issuer bank 104. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 102, merchant bank 112, and issuer bank 104. Settlement refers to the transfer of financial data or funds among merchant's 102 account, merchant bank 112, and issuer bank 104 related to the transaction. Usually, transactions are captured and accumulated into a "batch," which is settled as a group. More specifically, a transaction is typically settled between issuer bank 104 and payment card interchange network 302, and then between payment card interchange network 302 and merchant bank 112, and then between merchant bank 112 and merchant 102.

In the example embodiment, payment card interchange network 302 routes payment card transaction authorization requests (such as those initiated using potentially compromised payment cards) through fraud analysis computing system 100 as described above. Detection of patterns of fraudulent activity may enable payment card interchange network 302 to identify and prevent fraudulent transactions prior to authorization by issuer 104, thereby improving transaction processing speed and bandwidth available for legitimate transactions. Fraud analysis computing system 100 may be configured to provide fraud data associated with payment card transactions to a downstream fraud management system (not shown) for further processing. Fraud analysis computing system 100 may be incorporated on one or more computing devices within payment card interchange network 302, or may be embodied in one or more separate components communicatively accessible to payment card interchange network 302.

Figure 4:
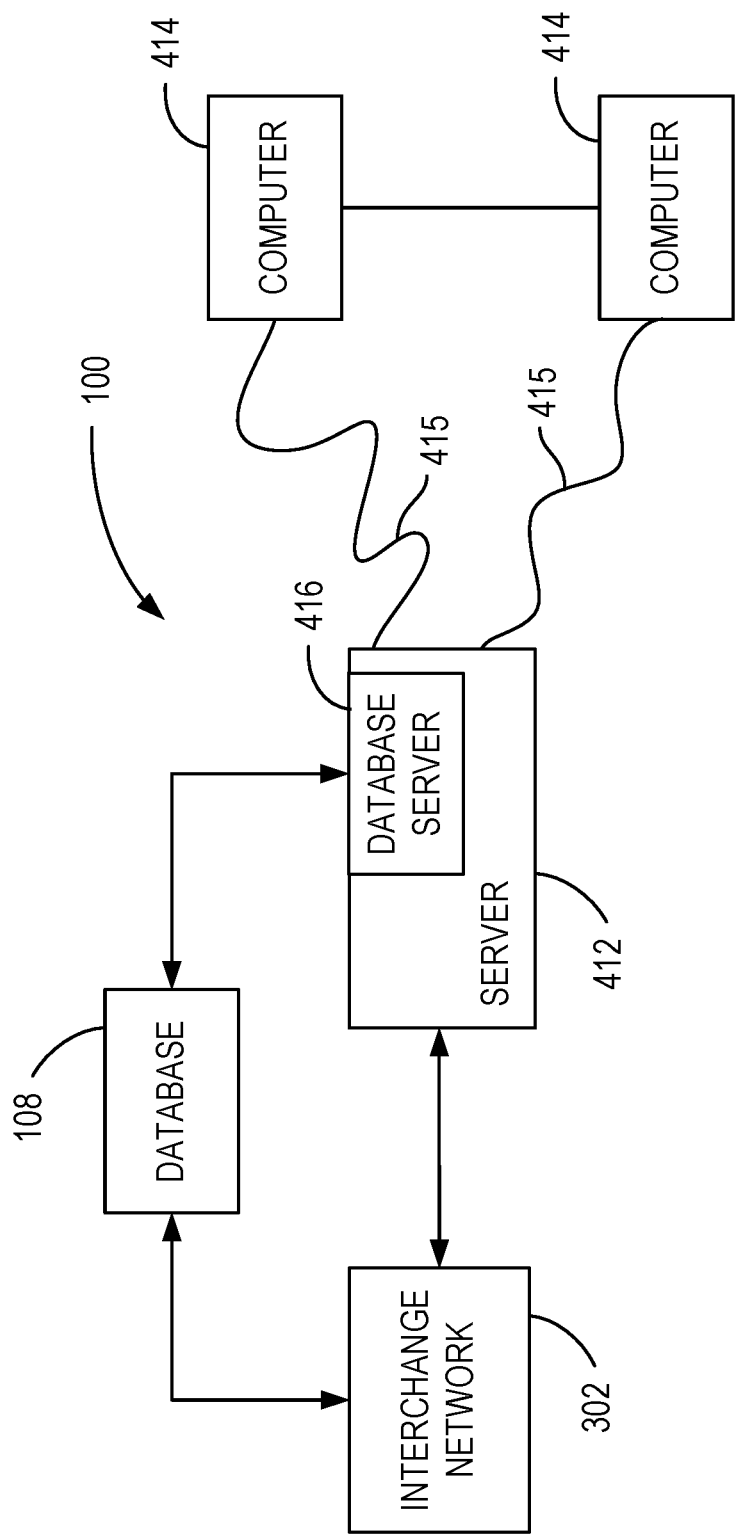

FIG. 4 is a simplified block diagram of an example fraud analysis computing system 100 in communication with payment interchange network 302 in accordance with one embodiment of the present disclosure. In the example embodiment, fraud analysis computing system 100 is implemented on a server system 412. A plurality of client systems 414 is connected to server system 412. In one embodiment, client systems 414 are computers including a web browser, such that server system 412 is accessible to client systems 414 using the Internet. Client systems 414 are interconnected to the Internet through network connections 415, such as a local area network (LAN) or a wide area network (WAN), dial-in-connections, cable modems, special high-speed Integrated Services Digital Network (ISDN) lines, and RDT networks. Client systems 414 could be any device capable of connecting to the Internet including a web-based phone, PDA, or other web-based connectable equipment.

Server system 412 includes a database server 416 connected to database 108, which contains information on a variety of matters, as described below in greater detail. In one embodiment, database 108 is centralized on, for example, server system 412 and can be accessed by potential users at one of client systems 414 by logging onto server system 412 through one of client systems 414. In an alternative embodiment, database 108 is stored remotely from server system 412 and may be non-centralized.

Database 108 may include a single database having separated sections or partitions, or may include multiple databases, each being separate from each other. Database 108 may store transaction data generated over payment card interchange network 302 including data relating to payment card transactions, fraudulent payment card transactions, and fraud scoring values and rules. Database 108 may also store account data for a plurality of cardholders, including at least one of a cardholder name, a cardholder address, an account number, other account identifiers, and transaction information. Database 108 may also store merchant data including a merchant identifier that identifies each merchant registered to use the network, and instructions for settling transactions including merchant bank account information. Database 108 may also store purchase data associated with items being purchased by a cardholder from a merchant, and authorization request data. Database 108 may also store fraud information received from fraud analysis computing system 100.

In the example embodiment, one of client systems 414 is a user computer device associated with a user of fraud analysis computing system 100. For example, the user computer device is configured to display graphical user interface 150 (shown in FIGS. 1 and 2) generated by fraud analysis computing system 100 via a web browser or dashboard application 152 (shown in FIG. 1) installed on the user computer device. Web browsers enable users of client system 414 to display and interact with media and other information typically embedded on a web page or a website associated with server system 412. Dashboard application 152 allows users to interact with a server application on server system 412.

Others of client systems 414 may be associated with acquirer or merchant bank 112 and issuer 104 (shown in FIGS. 1 and 3). In addition, client systems 414 may include a computer system associated with at least one of an online bank, a bill payment outsourcer, an acquirer bank, an acquirer processor, an issuer bank associated with a payment card, an issuer processor, a remote payment system, customers and/or billers. In the example embodiment, server system 412 is associated with payment card interchange network 302, and may be referred to as an interchange computer system. Server system 412 may be used for general processing of payment card transaction data as well as analyzing fraud data associated with payment card transactions.

Figure 5:
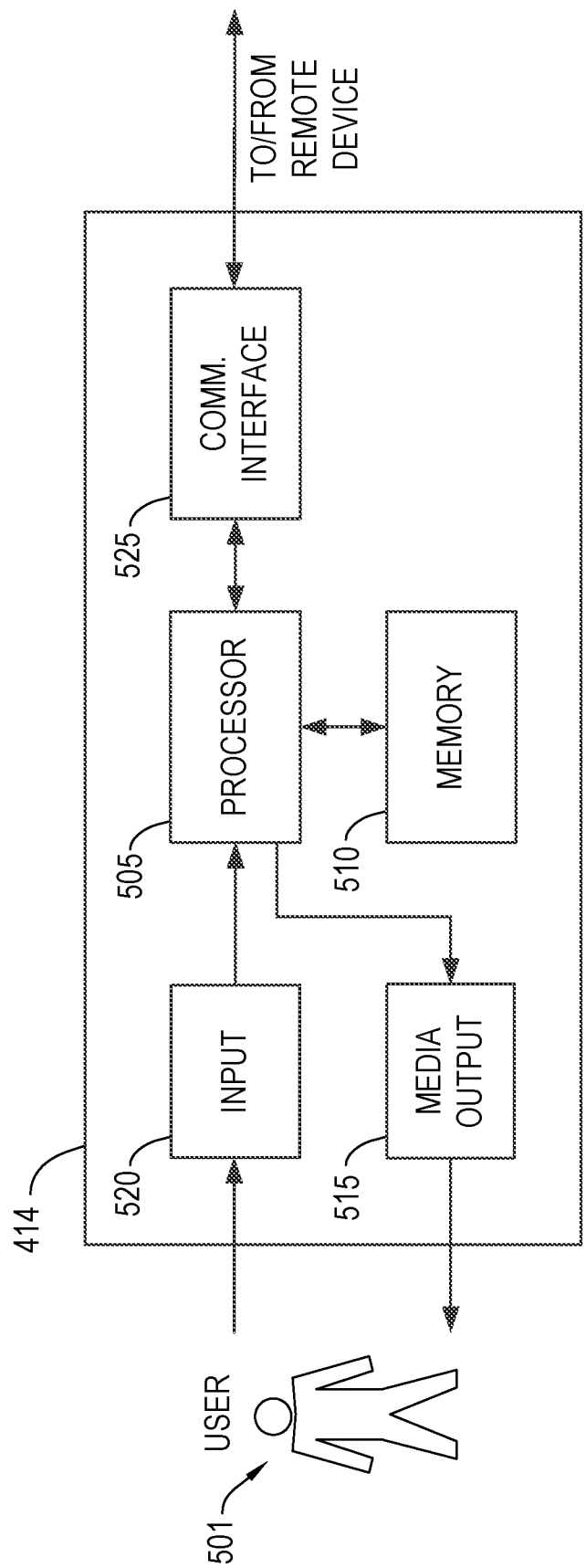

FIG. 5 illustrates an example configuration of one of client systems 414 operated by a user 501, such as an analyst. In the example embodiment, client system 414 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

Client system 414 also includes at least one media output component 515 for presenting information to user 501. Media output component 515 is any component capable of conveying information to user 501. For example, media output component is configured to display graphical user interface 150 (shown in FIG. 1) to user 501. In some embodiments, media output component 515 includes an output adapter such as a video adapter and/or an audio adapter. An output adapter is operatively coupled to processor 505 and operatively coupleable to an output device such as a display device, a liquid crystal display (LCD), organic light emitting diode (OLED) display, or "electronic ink" display, or an audio output device, a speaker or headphones.

In some embodiments, client system 414 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. Client system 414 may also include a communication interface 525, which is communicatively coupleable to a remote device such as server system 412. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 6:
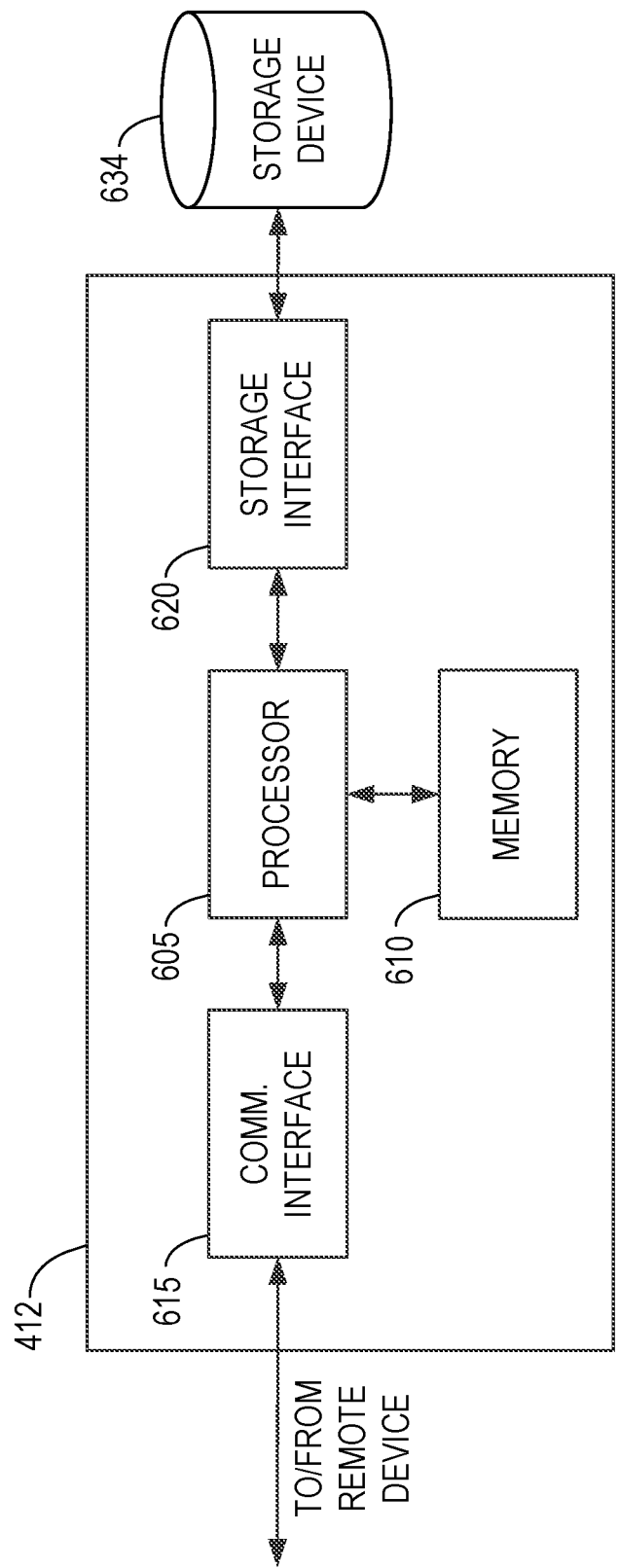

FIG. 6 illustrates an example configuration of server system 412. Server system 412 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on the server system 412, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface 615 such that server system 412 is capable of communicating with remote devices such as client systems 414 (shown in FIG. 4) or another server system 412. For example, communication interface 615 may receive requests from client system 414 via the Internet, as illustrated in FIG. 4.

Processor 605 may also be operatively coupled to a storage device 634, which may be used to implement database 108. Storage device 634 is any computer-operated hardware suitable for storing and/or retrieving data. In some embodiments, storage device 634 is integrated in server system 412. For example, server system 412 may include one or more hard disk drives as storage device 634. In other embodiments, storage device 634 is external to server system 412 and may be accessed by a plurality of server systems 412. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In operation, fraud analysis computing system 100 (shown in FIG. 1) runs on server system 412. In some embodiments, at least one of first fraud detection module 106, CDP engine 114, and second fraud detection module 120 runs on the same server system 412. Alternatively, each of first fraud detection module 106, CDP engine 114, and second fraud detection module 120 runs on separate server systems 412 communicatively coupled to each other. User 501 (shown in FIG. 5) interacts with server system 412, and with processes such as CDP engine 114, using one of client systems 414 (shown in FIG. 4).

Figure 7:
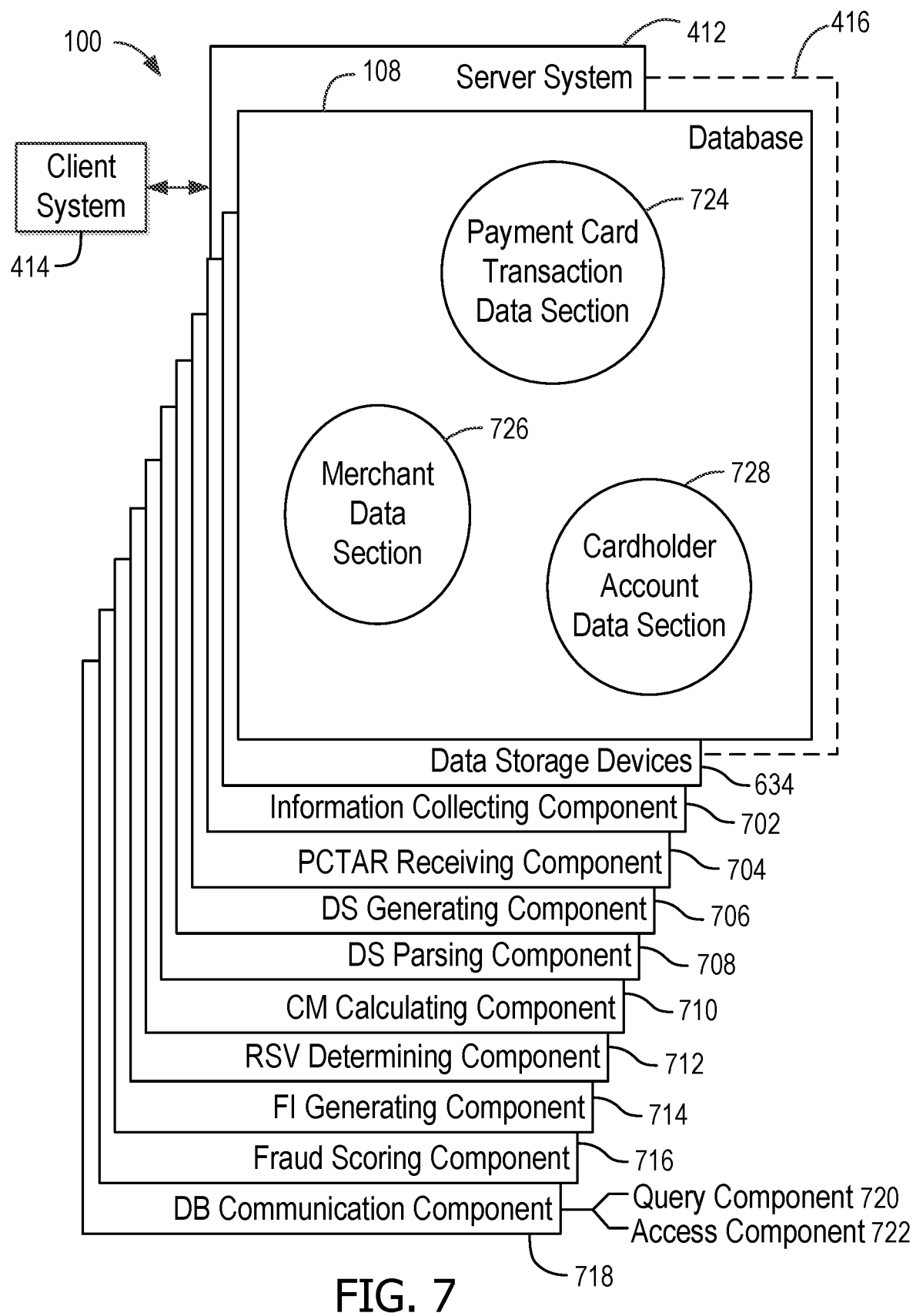

FIG. 7 shows an example configuration of fraud analysis computing system 100. Database 108 is coupled to several separate components within fraud analysis computing system 100, which perform specific tasks. In the example embodiment, server system 412, database server 416, and database 108 are all contained in a single computing device. In other embodiments, fraud management server system 412, database server 416, and database 108 may be contained in separate computing devices which are communicatively coupled to each other.

Fraud analysis computing system 100 in the example embodiment includes an information collecting component 702 for collecting information from users into database 108, a payment card transaction authorization request receiving component 704 for receiving subsequent transaction activity for the potential compromised payment cards, including payment card transaction authorization requests 110, 124, a data structure generating component 706 to generate data structures 118 for corresponding merchant groups, each having scored payment card transaction authorization requests sorted by fraud score, a data structure parsing component 708 to parse the data structures over a plurality of time periods, and a cumulative metric calculating component 710 to calculate cumulative metrics for various ones of the time periods based on the parsed data structures. Fraud analysis computing system 100 further includes a ratio striping value determining component 712 for determining ratio striping values from the cumulative metrics as described above. A feature input generating component 714 generates sets of feature inputs 132 using the determined ratio striping values. A fraud scoring component 716 receives the sets of feature inputs 132 and applies the features input to a fraud scoring model used to score (real-time) payment card transaction authorization requests during a detected fraud wave, as discussed above.

Fraud analysis computing system 100 also includes a database communication component 718 that includes a query component 720 programmed to receive a specific query from client system 414, and an access component 722 to access database 108. Query component 720 is programmed for receiving a specific query, a data request and/or a data message (collectively referred to as a "query") from one of a plurality of users. Database communication component 718 searches and processes received queries against database 108 and/or storage device 634 containing a variety of information collected by collection component 702. In an exemplary embodiment, database 108 is divided into a plurality of sections, including but not limited to, a Payment Card Transaction Data Section 724, a Merchant Data Section 726, and a Cardholder Account Data Section 728. These sections within database 108 are interconnected to update and retrieve the information as required.

Figure 8:
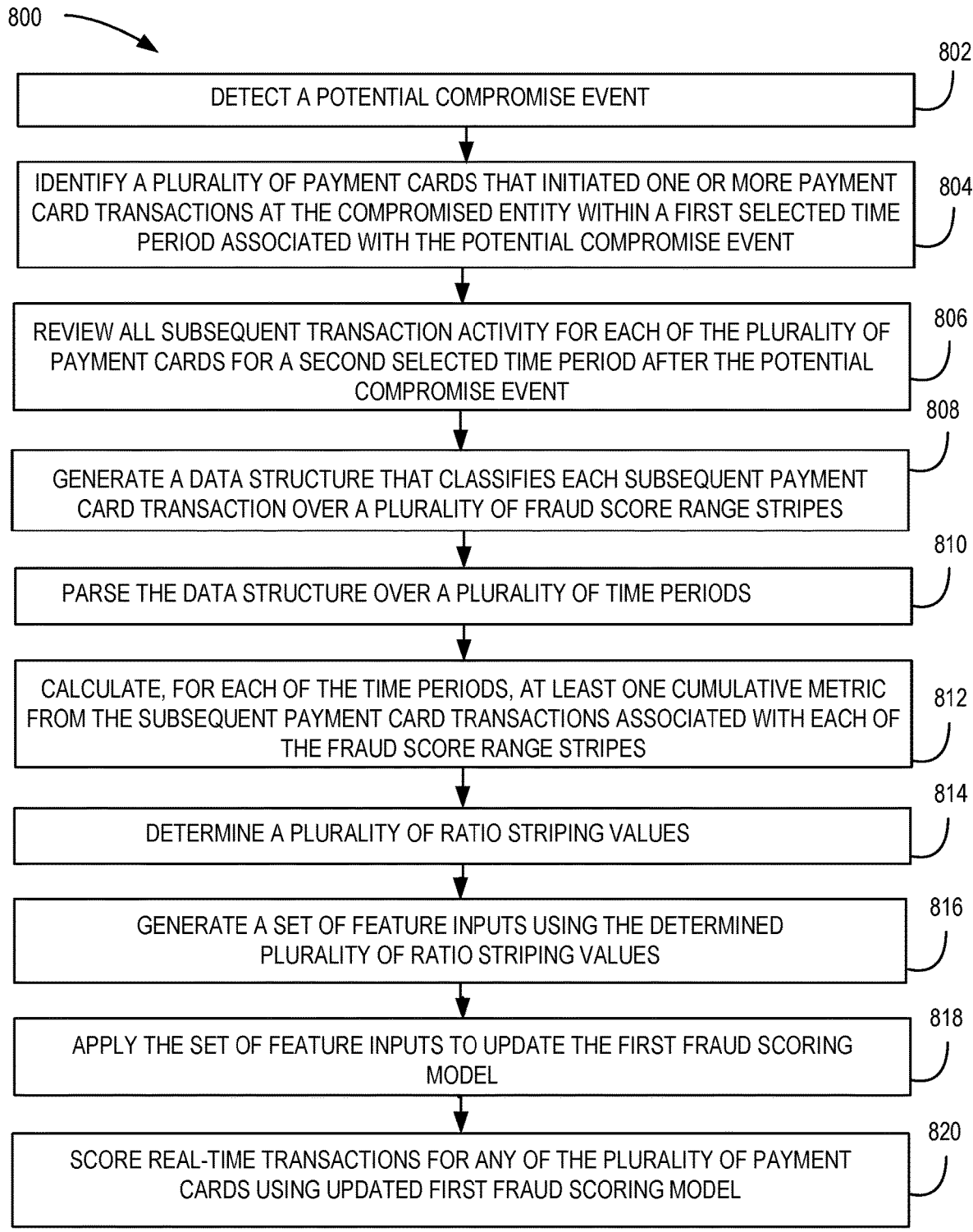

FIG. 8 is a flow diagram of a computer-implemented merchant profiling method 800 for detecting fraudulent network transactions in a payment card transaction network. Method 800 uses at least one computing device, such as fraud analysis computing system 100. The at least one computing device has at least one processor, such as processor 116, and the at least one processor performs the steps of the method.

With reference also to FIGS. 1 and 2, method 800 includes detecting 802 a potential compromise event, the potential compromise event associated with a compromised entity. Method 800 also includes identifying 804 a plurality of payment cards that initiated one or more payment card transactions at the compromised entity within a first selected time period associated with the potential compromise event, and reviewing 806 all subsequent transaction activity for each of the plurality of payment cards for a second selected time period after the potential compromise event. The respective subsequent transaction activity for each payment card includes one or more subsequent payment card transactions, and each subsequent payment card transaction is associated with a respective fraud score calculated using a first fraud scoring model.

Method 800 includes generating 808 a data structure that classifies each subsequent payment card transaction over a plurality of fraud score range stripes based on the respective fraud score, and parsing 810 the data structure over a plurality of time periods. Each of the time periods extends back over a respective predetermined interval from a common starting point (such as current analysis time 213).

Method 800 further includes calculating 812, for each of the time periods, at least one cumulative metric from the subsequent payment card transactions associated with each of the fraud score range stripes. In some embodiments, the at least one cumulative metric includes a tally of each scored payment card transaction authorization request 128 within each fraud score range stripe 206 over each of the plurality of time periods 214, a cumulative total of transaction amounts of scored payment card transaction authorization requests 128 scored within each fraud score range stripe 206 over each of the plurality of time periods 214, and/or a count of declined scored payment card transaction authorization requests 128 scored within each fraud score range stripe 206 over each of the plurality of time periods 214.

Method 800 also includes determining 814 a plurality of ratio striping values. Each of the ratio striping values is a ratio of a first value of the at least one cumulative metric in a first of the fraud score range stripes from a first time period with respect to a second value of the at least one cumulative metric in the first fraud score range stripe from a second time period, wherein the second time period extends back farther in time than the first time period. In some embodiments, method 800 includes determining a potential fraud wave associated with one or more of the plurality of payment cards based on the plurality of ratio striping values, and outputting a potential fraud wave alert.

Method 800 includes also generating 816 a set of feature inputs using the determined plurality of ratio striping values. In some embodiments, the feature inputs are generated to be equal to the determined plurality of ratio striping values. Alternatively, the feature inputs are generated by conditioning the ratio striping values, such as by squaring each ratio striping value to obtain a corresponding feature input.

Method 800 further includes applying 818 the set of feature inputs to update the first fraud scoring model, and scoring 820 one or more real-time payment card transactions initiated using any payment card of the plurality of payment cards using the updated fraud scoring model. In some embodiments, method 800 includes comparing one or more of the plurality of ratio striping values to a threshold ratio value indicating a likelihood of a potential fraud wave, and, when the one or more of the plurality of ratio striping values exceeds the threshold ratio value, automatically transmit an instruction to the fraud detection module causing the fraud detection module to apply the set of feature inputs to the first fraud detection model.

Method 800 optionally includes generating a graphical user interface including a graph having an x-axis graduated in units of time and a y-axis graduated in units of fraud score. The graph shows the plurality of fraud score range stripes extending horizontally. Each fraud score range stripe is delineated by an upper fraud score threshold and a lower fraud score threshold. The graph shows vertically extending time period boundaries intersecting the x-axis. The graphical user interface is displayable on a display screen of a user computer device.

As used herein, "machine learning" refers to statistical techniques to give computer systems the ability to "learn" (e.g., progressively improve performance on a specific task) with data, without being explicitly programmed for that specific task.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing system for detecting and preventing fraudulent network events in a payment card network by incorporating breach velocities into fraud scoring models, said computing system comprising a memory communicatively coupled to a processor, the memory having computer-executable instructions stored thereon that when executed by the processor implement:
a compromise detection and prevention (CDP) engine configured to:
detect a potential compromise event, the potential compromise event associated with a compromised entity;
identify a plurality of payment cards that initiated one or more payment card transactions at the compromised entity within a first selected time period associated with the potential compromise event;
review all subsequent transaction activity for each of the plurality of payment cards for a second selected time period after the first selected time period and after the potential compromise event, the respective subsequent transaction activity for each payment card including one or more subsequent payment card transactions, each subsequent payment card transaction associated with a respective fraud score calculated using a first fraud scoring model executing one or more machine-learning algorithms;
generate a data structure that classifies each subsequent payment card transaction over a plurality of fraud score range stripes based on the respective fraud score;
parse the data structure over a plurality of time periods, wherein each of the plurality of time periods extends back in time over a respective predetermined interval from a common starting point in time;
calculate, for each of the plurality of time periods, at least one cumulative metric from the subsequent payment card transactions associated with each of the fraud score range stripes;
determine a plurality of ratio striping values, each of the ratio striping values being a ratio of a first value of the at least one cumulative metric in a first of the fraud score range stripes from a first time period of the plurality of time periods with respect to a second value of the at least one cumulative metric in the first fraud score range stripe from a second time period of the plurality of time periods, wherein the second time period extends back farther in time than the first time period;
detect a potential fraud wave associated with one or more of the plurality of payment cards based on the plurality of ratio striping values; and
transmit, to a fraud detection module, a set of feature inputs generated using the determined plurality of ratio striping values, the set of feature inputs indicative of the potential fraud wave; and the fraud detection module communicatively coupled to the CDP engine and configured to:
execute the first fraud scoring model;
apply the set of feature inputs to update the one or more machine-learning algorithms executed by the first fraud scoring model to generate an updated first fraud scoring model;
execute the updated first fraud scoring model on a plurality of real-time payment card transactions initiated after the detection of the potential fraud wave;
receive, from the updated first fraud scoring model, for each of the plurality of real-time payment card transactions, an output including the fraud score for the respective real-time payment card transaction, wherein the updating of the one or more machine-learning algorithms executed by the first fraud scoring model causes the updated first fraud scoring model to increase the fraud score for the real-time payment card transactions associated with any one of the plurality of payment cards that initiated the one or more payment card transactions at the compromised entity within the first selected time period;
cause decline of a first subset of the plurality of real-time payment card transactions based on the respective score for each of the first subset of the plurality of real-time payment card transactions, comprising preventing transmission, in real-time, of each authorization request message, of a respective plurality of authorization request messages associated with the first subset of the plurality of real-time payment transactions, to a respective issuer of the respective payment card over the payment card network, wherein said preventing transmission prevents fraudulent transactions from being authorized and improves processing and memory resources available for legitimate transactions across the payment card network; and
cause acceptance of only a second subset of the plurality of real-time payment card transactions based on the respective score for each of the second subset of the plurality of real-time payment card transactions, including transmitting, in real time, each of a respective plurality of authorization request messages, associated with only the second subset of the plurality of real-time payment transactions, to a respective issuer of the respective payment card over the payment card network.

2. The computing system of claim 1, wherein the CDP engine is further configured to generate a graphical user interface including a graph having an x-axis graduated in units of time and a y-axis graduated in units of fraud score, the graph showing the plurality of fraud score range stripes extending horizontally, each delineated by an upper fraud score threshold and a lower fraud score threshold, the graph showing vertically extending time period boundaries intersecting the x-axis, the graphical user interface displayable on a display screen of a user computer device.

3. The computing system of claim 1, wherein the CDP engine is further configured to output a potential fraud wave alert in response to the detection of the potential fraud wave.

4. The computing system of claim 1, wherein the CDP engine is further configured to calculate the at least one cumulative metric including a tally of each subsequent payment card transaction scored within each fraud score range stripe over each of the plurality of time periods.

5. The computing system of claim 1, wherein the CDP engine is further configured to calculate the at least one cumulative metric including a cumulative total of transaction amounts of subsequent payment card transactions scored within each fraud score range stripe over each of the plurality of time periods.

6. The computing system of claim 1, wherein the CDP engine is further configured to calculate the at least one cumulative metric including a count of declined subsequent payment card transactions scored within each fraud score range stripe over each of the plurality of time periods.

7. The computing system of claim 1, wherein the CDP engine is further configured to generate the set of feature inputs as being equal to the determined plurality of ratio striping values.

8. The computing system of claim 1, wherein the CDP engine is further configured to:
detect the potential fraud wave by comparing one or more of the plurality of ratio striping values to a threshold ratio value indicating a likelihood of the potential fraud wave; and
in response to any of the one or more of the plurality of ratio striping values exceeding the threshold ratio value, automatically transmit an instruction to the fraud detection module causing the fraud detection module to apply the set of feature inputs to the first fraud scoring model.

9. The computing system of claim 1, wherein the common starting point comprises an analysis time at which the CDP engine is parsing the data structure.

10. A computer-implemented method for detecting fraudulent network transactions in a payment card transaction network by incorporating breach velocities into fraud scoring models, said method implemented using at least one computing device having at least one processor, said method comprising:
executing, by the at least one processor, a first fraud scoring model;
detecting, by the at least one processor, a potential compromise event, the potential compromise event associated with a compromised entity;
identifying, by the at least one processor, a plurality of payment cards that initiated one or more payment card transactions at the compromised entity within a first selected time period associated with the potential compromise event;
reviewing, by the at least one processor, all subsequent transaction activity for each of the plurality of payment cards for a second selected time period after the first selected time period and after the potential compromise event, the respective subsequent transaction activity for each payment card including one or more subsequent payment card transactions, each subsequent payment card transaction associated with a respective fraud score calculated using the first fraud scoring model executing one or more machine-learning algorithms;
generating, by the at least one processor, a data structure that classifies each subsequent payment card transaction over a plurality of fraud score range stripes based on the respective fraud score;
parsing, by the at least one processor, the data structure over a plurality of time periods, wherein each of the plurality of time periods extends back in time over a respective predetermined interval from a common starting point in time;
calculating, by the at least one processor, for each of the plurality of time periods, at least one cumulative metric from the subsequent payment card transactions associated with each of the fraud score range stripes;

determining, by the at least one processor, a plurality of ratio striping values, each of the ratio striping values being a ratio of a first value of the at least one cumulative metric in a first of the fraud score range stripes from a first time period of the plurality of time periods with respect to a second value of the at least one cumulative metric in the first fraud score range stripe from a second time period of the plurality of time periods, wherein the second time period extends back farther in time than the first time period;

detecting, by the at least one processor, a potential fraud wave associated with one or more of the plurality of payment cards based on the plurality of ratio striping values;

transmitting, by the at least one processor to the fraud detection module, a set of feature inputs generated using the determined plurality of ratio striping values, the set of feature inputs indicative of the potential fraud wave;

applying, by the at least one processor, the set of feature inputs to update the one or more machine-learning algorithms executed by the first fraud scoring model to generate an updated first fraud scoring model;

executing, by the at least one processor, the updated first fraud scoring model on a plurality of real-time payment card transactions initiated after the detection of the potential fraud wave;

receiving, by the at least one processor, from the updated first fraud scoring model, for each of the plurality of real-time payment card transactions, an output including the fraud score for the respective real-time payment card transaction, wherein the updating of the one or more machine-learning algorithms executed by the first fraud scoring model causes the updated first fraud scoring model to increase the fraud score for the real-time payment card transactions associated with any one of the plurality of payment cards that initiated the one or more payment card transactions at the compromised entity within the first selected time period;

causing decline, by the at least one processor, of a first subset of the plurality of real-time payment card transactions based on the respective score for each of the first subset of the plurality of real-time payment card transactions, comprising preventing transmission, in real-time, of each authorization request message, of a respective plurality of authorization request messages associated with the first subset of the plurality of real-time payment transactions, to a respective issuer of the respective payment card over the payment card network, wherein said preventing transmission prevents fraudulent transactions from being authorized and improves processing and memory resources available for legitimate transactions across the payment card network; and causing acceptance, by the at least one processor, of only a second subset of the plurality of real-time payment card transactions based on the respective score for each of the second subset of the plurality of real-time payment card transactions, including transmitting, in real time, each of a respective plurality of authorization request messages, associated with only the second subset of the plurality of real-time payment transactions, to a respective issuer of the respective payment card over the payment card network.

11. The computer-implemented method of claim 10, further comprising generating a graphical user interface including a graph having an x-axis graduated in units of time and a y-axis graduated in units of fraud score, the graph showing the plurality of fraud score range stripes extending horizontally, each delineated by an upper fraud score threshold and a lower fraud score threshold, the graph showing vertically extending time period boundaries intersecting the x-axis, the graphical user interface displayable on a display screen of a user computer device.

12. The computer-implemented method of claim 10, further comprising the steps of outputting a potential fraud attack alert in response to the detection of the potential fraud wave.

13. The computer-implemented method of claim 10, further comprising calculating, by the at least one processor, the at least one cumulative metric including a tally of each subsequent payment card transaction scored within each fraud score range stripe over each of the plurality of time periods.

14. The computer-implemented method of claim 10, wherein the step of detecting the potential fraud wave further comprises:
  comparing, by the at least one processor, one or more of the plurality of ratio striping values to a threshold ratio value indicating a likelihood of the potential fraud wave; and
  in response to any of the one or more of the plurality of ratio striping values exceeding the threshold ratio value, automatically transmitting, by the at least one processor, an instruction to the fraud detection module causing the fraud detection module to apply the set of feature inputs to the first fraud scoring model.

15. The computer-implemented method of claim 10, further comprising calculating the at least one cumulative metric including at least one of: (i) a tally of each subsequent payment card transaction scored within each fraud score range stripe over each of the plurality of time periods, (ii) a cumulative total of transaction amounts of subsequent payment card transactions scored within each fraud score range stripe over each of the plurality of time periods, and (iii) a count of declined subsequent payment card transactions scored within each fraud score range stripe over each of the plurality of time periods.

16. At least one non-transitory computer-readable storage media having computer-executable instructions embodied thereon wherein, when executed by at least one processor, the computer-executable instructions cause the at least one processor to:
  execute a first fraud scoring model;
  detect a potential compromise event, the potential compromise event associated with a compromised entity;
  identify a plurality of payment cards that initiated one or more payment card transactions at the compromised entity within a first selected time period associated with the potential compromise event;
  review all subsequent transaction activity for each of the plurality of payment cards for a second selected time period after the first selected time period and after the potential compromise event, the respective subsequent transaction activity for each payment card including one or more subsequent payment card transactions, each subsequent payment card transaction associated with a respective fraud score calculated using the first fraud scoring model executing one or more machine-learning algorithms;

generate a data structure that classifies each subsequent payment card transaction over a plurality of fraud score range stripes based on the respective fraud score;

parse the data structure over a plurality of time periods, wherein each of the plurality of time periods extends back in time over a respective predetermined interval from a common starting point in time;

calculate, for each of the plurality of time periods, at least one cumulative metric from the subsequent payment card transactions associated with each of the fraud score range stripes;

determine a plurality of ratio striping values, each of the ratio striping values being a ratio of a first value of the at least one cumulative metric in a first of the fraud score range stripes from a first time period of the plurality of time periods with respect to a second value of the at least one cumulative metric in the first fraud score range stripe from a second time period of the plurality of time periods, wherein the second time period extends back farther in time than the first time period;

detect a potential fraud wave associated with one or more of the plurality of payment cards based on the plurality of ratio striping values;

transmit, to the fraud detection module, a set of feature inputs generated using the determined plurality of ratio striping values, the set of feature inputs indicative of the potential fraud wave;

apply the set of feature inputs to update the one or more machine-learning algorithms executed by the first fraud scoring model to generate an updated first fraud scoring model;

execute the updated first fraud scoring model on a plurality of real-time payment card transactions initiated after the detection of the potential fraud wave;

receive, from the updated first fraud scoring model, for each of the plurality of real-time payment card transactions, an output including the fraud score for the respective real-time payment card transaction, wherein the updating of the one or more machine-learning algorithms executed by the first fraud scoring model causes the updated first fraud scoring model to increase the fraud score for the real-time payment card transactions associated with any one of the plurality of payment cards that initiated the one or more payment card transactions at the compromised entity within the first selected time period;

cause decline of a first subset of the plurality of real-time payment card transactions based on the respective score for each of the first subset of the plurality of real-time payment card transactions, comprising preventing transmission, in real-time, of each authorization request message, of a respective plurality of authorization request messages associated with the first subset of the plurality of real-time payment transactions, to a respective issuer of the respective payment card over the payment card network, wherein said preventing transmission prevents fraudulent transactions from being authorized and improves processing and memory resources available for legitimate transactions across the payment card network; and cause acceptance of only a second subset of the plurality of real-time payment card transactions based on the respective score for each of the second subset of the plurality of real-time payment card transactions, including transmitting, in real time, each of a respective plurality of authorization request messages, associated with only the second subset of the plurality of real-time payment transactions, to a respective issuer of the respective payment card over the payment card network.

17. The computer-readable storage media of claim 16, wherein the computer-executable instructions further cause the processor to calculate the at least one cumulative metric including a tally of each subsequent payment card transaction scored within each fraud score range stripe over each of the plurality of time periods.

18. The computer-readable storage media of claim 16, wherein the computer-executable instructions further cause the processor to calculate the at least one cumulative metric including a cumulative total of transaction amounts of subsequent payment card transactions scored within each fraud score range stripe over each of the plurality of time periods.

19. The computer-readable storage media of claim 16, wherein the computer-executable instructions further cause the processor to calculate the at least one cumulative metric including a count of declined subsequent payment card transactions scored within each fraud score range stripe over each of the plurality of time periods.

20. The computer-readable storage media of claim 16, wherein the computer-executable instructions further cause the processor to:

detect the potential fraud wave by comparing one or more of the plurality of ratio striping values to a threshold ratio value indicating a likelihood of the potential fraud wave; and in response to any of the one or more of the plurality of ratio striping values exceeding the threshold ratio value, automatically transmit an instruction to the fraud detection module causing the fraud detection module to apply the set of feature inputs to the first fraud scoring model.

* * * * *